United States Patent [19]
Maxwell

[11] Patent Number: 6,098,070
[45] Date of Patent: Aug. 1, 2000

[54] CASE MANAGEMENT FOR A PERSONAL INJURY PLAINTIFF'S LAW OFFICE USING A RELATIONAL DATABASE

[75] Inventor: John M. Maxwell, Long Beach, Calif.

[73] Assignee: Hipersoft Corp., Long Beach, Calif.

[21] Appl. No.: 09/094,203

[22] Filed: Jun. 9, 1998

[51] Int. Cl.[7] ....................................... G06F 17/00
[52] U.S. Cl. ........................ 707/102; 207/203; 207/204; 207/101
[58] Field of Search ......................... 707/1–206

[56] References Cited

U.S. PATENT DOCUMENTS

| | | | |
|---|---|---|---|
| 5,392,428 | 2/1995 | Robins ........................................ 707/1 |
| 5,557,515 | 9/1996 | Abbruzzese et al. ................... 364/401 |
| 5,628,004 | 5/1997 | Gormley et al. ........................ 395/615 |
| 5,675,784 | 10/1997 | Maxwell et al. ........................ 395/611 |
| 5,703,271 | 12/1997 | Shepard .................................. 128/897 |
| 5,875,431 | 2/1999 | Heckman et al. .......................... 705/7 |
| 5,956,687 | 9/1999 | Wamsley et al. ........................... 705/1 |

OTHER PUBLICATIONS

Robert Reilly, "Mapping Legal Metaphors in Cyberspace: Evolving the Underlying Paradigm", The John Marshall Journal of Computer and Information Law, pp. 579–581, Spring, 1998.
www.amicus.ca/forms/supportmail.html, Feb. 2000.
www.apollosoftware.net, Feb. 2000.
http://courtstuff.com/5th/index.html, Feb. 2000.
www.state.nj.us/judiciary/demrpt.htm, Feb. 2000.
wysiwyg://41/http://www.amicus.ca/, Feb. 2000.
www.amicusattorney.com/upgrade/index.html, Feb. 2000.

*Primary Examiner*—Thomas G. Black
*Assistant Examiner*—David Jung
*Attorney, Agent, or Firm*—Steven C. Sereboff; Arter & Hadden LLP

[57] ABSTRACT

An electronic case manager for a personal injury plaintiffs law office in which client and defendant level data related to an injury incident are collected and organized in an efficient manner. The electronic case manager include a relational database having a number of tables, and a database management program.

6 Claims, 34 Drawing Sheets

---

File No.: 1000  Name: Testcase, Marilyn

Injury Summary
Severed head wounds and trauma to all parts of body; Broken arm; lacerations to the elbow that required stitches;

510 — Ready to Settle: Yes
511 — Demand Letter Sent: Jun. 9, 1997-Mon
512 — Settlement Type: Litigation
513 — Settlement Date: Jun. 29, 1997-Sun
514 — Contingent Fee: 40%
515 — Offer: $100,000.00

| | | Actual | Modified |
|---|---|---:|---:|
| Atty Fees: | | $40,000.00 | $40,000.00 |
| Present: | Meds: | $21,150.75 | $21,150.75 |
| | LOE: | $2,625.00 | |
| | P/D: | $3,499.00 | |
| | Costs | $70.00 | $70.00 |
| Future: | Meds: | $22,000.00 | |
| | LOE: | | |
| Ins. Reimbursement | | $1,000.00 | $500.00 |
| Net to Client: | | $15,779.25 | $16,279.25 |

Note: P/D and LOE are NOT used in "Net to Client" Calculation. Future Meds and Future LOE ARE used in BOTH Actual and Modified "Net to Client" Calculations.

| | | |
|---|---|---|
| File No.: | 1000 | ⟋ 509 |
| Date/Loss: | Apr. 1, 1996-Mon | |
| Type: | Vehicle Accident | ⟋ 507 |
| Status: | Active | |
| Source: | Grandpa Joe | |
| Entry Date: | Apr. 15, 1996-Mon | ⟋ 508 |
| Attorney: | John M. Maxwell | |
| Bar No.: | 143730 | |

| | |
|---|---|
| First Name: | Marilyn |
| Mid Name: | Middrift |
| Last Name: | Testcase |
| Address: | 1414 Mockingbird Lane |
| City: | Creepsville |
| State/Zip: | CA    90013 |
| Tel: | Home   (550) 555-1212 |
| | Fax    (550) 555-1313 |
| E-Mail: | Marilyn@Munsters.com |
| Date/birth: | Oct. 31, 1998-Sat |
| Place/birth: | Transylvania |
| DL#: | XT40413; exp. 10/31/99; no |
| SS#: | 444-13-1313 |
| AKA: | Baby Marilyn |
| Gender: | Female |
| Language: | English |
| Married: | No |
| Guardian: | |
| Salutation: | Dear Ms. Testcase: |

501 } (First/Mid/Last Name)
502 } (Address through Fax)
503 — E-Mail area
504 — SS#
505 — AKA
506 — Salutation

Figure 5A

File No.: 1000  Name: Testcase, Marilyn

Injury Summary

510 — Ready to Settle: Yes
511 — Demand Letter Sent: Jun. 9, 1997-Mon
512 — Settlement Type: Litigation
513 — Settlement Date: Jun. 29, 1997-Sun
514 — Contingent Fee: 40%

Severed head wounds and trauma to all parts of body; Broken arm; lacerations to the elbow that required stitches;

515 — Offer: $100,000.00

|  |  | Actual | Modified |
|---|---|---|---|
| Atty Fees: |  | $40,000.00 | $40,000.00 |
| Present: | Meds: | $21,150.75 | $21,150.75 |
|  | LOE: | $2,625.00 |  |
|  | P/D: | $3,499.00 |  |
|  | Costs | $70.00 | $70.00 |
| Future: | Meds: | $22,000.00 |  |
|  | LOE: |  |  |
| Ins. Reimbursement: |  | $1,000.00 | $500.00 |
| Net to Client: |  | $15,779.25 | $16,279.25 |

Note: P/D and LOE are NOT used in "Net to Client" Calculation. Future Meds and Future LOE ARE used in BOTH Actual and Modified "Net to Client" Calculations.

Figure 5B

701 — File No.: 1000
703 — Key-Adjuster: Betty Bright
702 — Insured:
Company: Tombstone Insurance
Address: 10100 Stonewall Road City: Barricade
State/Zip: CA 90000
Adjuster: Betty Bright
Salutation: Dear Ms. Bright:
Tel.: ☎ Office (562) 555-9999
☎ Fax (562) 555-9998
☎
1

Manager: Terry Terrible
Supervisor: Harry Horrible
Policy #: —— 705
Claim #:
Policy Lim: —— 706
Deductible:
Med Pay: —— 708
Reimburse?: —— 709
Rental Car?:
Unins Mot?: —— 710
UM Lim: —— 711

Law Firm:
Address:

City:
State/Zip:
Secretary:

Figure 8

File No.: 1000
[Key-Atty.]
Attorney:
Party:
Salutation:
Tel.:

801
802
803

| File No.: | 1000 | | |
|---|---|---|---|
| Date/Loss: | Mon, Apr 1, 1996 | Time/Loss: | |
| Accid Type: | Dog Bite | # of Vehicles: | Two |
| Location | | | |
| Description: | | | |
| Code Viol: | C.C. 3342 Dog bites liability of owner | | |
| Conditions: | Dusk | | |
| Intoxication: | | | |
| Prior Accid?: | | | |
| Details of Prior Claim: | | | |
| Notes: | | | |

Figure 9

File No.: 1000 VEHICLE INFORMATION

1001

Type/Year:
Lic Plate:
Reg. Owner:
Photos:
Description:

1003
1004
1005
1006
1007

Mileage:
Repaired?:
Rent Car Co:
Amount

File No.: 1000 Name: Testcase, Marilyn

Key-Med: Transylvania Community
Provider: Transylvania Community
Address: 2626 Hoag Street
City: Newport Beach
State/Zip: CA / 92677
Doctor: Mary Shelley, M.D.
Tel.: ☎ Office (714) 555-2020
      ☎ Fax (714) 555-2021
Contact: Boris
Billing Srv.: No
Srv. Name:
Address:
City:
State/Zip:
Tel.: ☎
      ☎

First Exam: Apr. 1, 1996-Mon
Final Exam: Nov. 1, 1996-Fri
Rpt Rec'd: Yes
Rec Rec'd: Yes
Bill Rec'd: No
Lien Signed?: Yes
Injury: Broken arm; lacerations to the
Treatd: that required stitches Trtmt   Surgery to reconnect head to b
Rec'd:  also had neurological transfor
        treatment to re-program her br Future  Patient has been advised to ha
Trtmt:  plastic surgery to take care of s
        around neck

1401 — File No.: 1000   Name: Testcase, Marilyn

1402
- Key-Expert: Grand, M.D.
- First Name: Harvey
- Last Name: Grand, M.D.
- Address: 5600 Wilshire Blvd., Suite 780
- City: Los Angeles
- State/Zip: CA  90025
- Tel: 📞 Office  (310) 655-4545

- Pla/Def: Plaintiff
- Specialty: Neurological Patt
- Docs Sent:
- Rate:
- Depo Min:
- Trial Min:
- Salutation: Dear Dr. Grand:
- Contact 1403 — Opinions: Dr. Grand believes that MT vehicle was hit with a force of at l 50 G forces upon impact; in addition, Dr. Grand opines that other driver's reaction time was more than 2 seconds.

Figure 14

1501 — File No.: 1000
1502 — Doc Name:
1503 — Issue:
1504 — Description:
1505 — Party Supported:
1506 — Date Rec'd:
1507 — Rec'd From:
1508 — Admissible?
1509 — Objections:
1510 — Arguments:
1511 — Authority:
1512 — Mot in Limine:

Figure 15

File No.: 1000

| Appearance | Date | Time | Dept./Div. | Judge |

— 1601

COURT INFORMATION

Case No.: — 1602
Ct. No.:
Court: — 1603
State:
County:
District:

Trial Date: — 1604
Trial Time:
Dept/Div: — 1605
Trial Judge: — 1606
— 1607

| Deadline | Filed/Served |
| --- | --- |
| PRE-DISCOVERY DEADLINES | |
| Gov't Tort Claim: | |
| Civil Complaint: | |
| Complaint Served: | |
| Proof of Service: | |
| Answer/X-Comp: | |
| Resp to X-Comp: | |
| At Issue: | |
| DISCOVERY DEADLINES | |
| Judicial Arb: | |
| Discovery Service: | |
| Discovery Cut-off: | |
| Disc Motion: | |
| POST-DISCOVERY/PRE-TRIAL | |
| Summ Judg: | |
| Post Jury Fees: | |
| EXPERT WITNESS EXCHANGE | |
| Disclosure: | |
| Written Response: | |
| Supp. Disclosure: | |

Figure 16

File No.: 1000 Name: Testcase, Marilyn

| Date | Type | Charge | Amt Paid |
|---|---|---|---|
| 5/11/97 | Copy Police Report Littletown Police Dept. | $45.00 | $45.00 |

BODY SHOP INFORMATION

File No.: 1000  Name: Testcase, Marilyn

Name:
Address:
City:
State/Zip:
Tel: ☎ ☎
Contact:
Veh ID:
Estimate:

| | |
|---|---|
| 2401 — Key-Atty: | Firmin Velize, Esq. |
| 2402 — Firm: | Briefcase & Velize |
| 2403 — Attorney: | Firmin Velize, Esq. |
| Salutation: | Dear Mr. Velize: |
| Address: | 666 Under Terrace Road |
| City: | Transylvania |
| State: | CA |
| Zip: | 90003 |
| 2404 { Tel: Office | (550) 555-1200 |
| Fax | (550) 555-3354 |
| 2405 — Secretary: | Monticia |

Figure 24

| | | |
|---|---|---|
| 2501 — | Key-Adjuster: | Betty Bright |
| 2502 — | Company: | Tombstone Insurance |
| | Adjuster: | Betty Bright |
| 2503 — | Salutation: | Dear Ms. Bright. |
| | Address: | 10100 Stonewall Road |
| | City: | Barricade |
| 2504 | State: | CA |
| | Zip: | 90000 |
| | Tel: | ☎ Office (562) 555-9999 |
| | | ☎ Fax (562) 555-9998 |
| 2505 — | Manager: | Terry Terrible |
| 2506 — | Supervisor: | Harry Horrible |

Number: 100
First Name: Fredereich
Last Name: Eikenburg, Esq.
Address: 967 Donor Drive
City: Transylvania
State: CA
Zip: 90000
Tel: 📞 📞 Office (555) 432-1101
Contact: Marlena
Panel Name: Transylvania Arbitration Society
Salutation: Dear Mr. Eikenburg:

Figure 28

3001 {
- Last Name: Maxwell
- First Name: John M.
- Address:
- City:
- State:
- Zip:
- Telephone:

- State Bar No: 143730
- Admission Date: Dec. 11, 1989-Mon
- Start Date:
- Law School: Loyola Law School
- Signature Block: Respectfully yours,
- Signature Name: John M. Maxwell, Esq.
- Initials: JMM/sa

Figure 30

CASE MANAGEMENT FOR A PERSONAL INJURY PLAINTIFF'S LAW OFFICE USING A RELATIONAL DATABASE

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates generally to automation of law offices, and more particularly to automation of personal injury law practices.

2. Description of Related Art

For an attorney experienced in personal injury plaintiff's work, cases proceed in a fairly predictable process. The client usually retains the attorney on a contingency basis, so that the attorney only is paid if there is a recovery for the client's injuries. The client usually has injuries which are treated by various professionals, such as doctors, dentists, physical therapists and chiropractors. The client typically seeks compensation for the costs of these treatments. The client may have other costs for which he seeks compensation, such as for repair of auto damage. Finally, the client may seek compensation for other things, such as pain and suffering, lost consortium, lost wages, etc.

It is well-known that most personal injury cases are settled. Of all personal injury cases, only a small percentage advance to the filing of a complaint, and fewer still advance through final judgement. The plaintiff's attorney is motivated to settle because of the high cost for the attorney to pursue a lawsuit. The defense attorney is motivated to settle because of the risk of a huge damage award against his client in litigation. In fact, early settlement is the norm in personal injury cases. Profitability of a personal injury law office often depends on efficient movement of cases toward settlement.

In running a personal injury law practice, an attorney or trained staff-member must spend hours to complete the necessary forms and documents needed to prepare a personal injury case for settlement. At the outset, letters must be sent to the client and insurance companies, and as the case progresses, letters and documents must be exchanged with medical providers, opposing attorneys, and eventually the courts. The time spent preparing these documents can severely distract personal injury attorneys from more important matters such as researching and investigating their cases and building their practices.

In many jurisdictions, the courts have promulgated required forms for practice before them. In California, personal injury lawyers commonly use a type of document called a Judicial Council form. The Judicial Council forms are official forms promulgated by the California Judicial Council, a court agency.

Studies have shown that an experienced personal injury lawyer spends approximately 25 hours working up a case to the point of settlement. Assuming a billing rate of $100/hour, the cost to settle the average case is $2,500. The attorney fees generated in a settlement of an average case are $3,200.

By automating the case handling and document production processes, software can reduce the amount of time required to prepare a case for settlement. By reducing the amount of time required to work up the average case, the profit margin can increase substantially. Furthermore, the attorney has more time to spend investigating and preparing their cases and obtaining new clients.

There are a number of computer programs which a personal injury plaintiff's law office can use for case management. These case management systems include databases for various relevant information, and often can generate calendars of previously entered due dates. These case management systems also serve as contact managers, and frequently will handle billing and accounting as well.

One of the major impediments to efficient management of data in a personal injury plaintiff's law office is the complex nature of the data. For a given case, the law office may represent many clients, each with differing claims and injuries. There may be many defendants. Many third parties are also involved in the process: defendants' lawyers, doctors, witnesses, expert witnesses, police departments, auto body shops, insurance companies, attorneys for the insurance companies, etc. Because there is so much information, typical systems have been unable to provide for efficient data entry and management. These are critical precedent steps toward gaining the benefits from these types of programs.

Relational databases have been known for quite some time. A relational database consists of a collection of tables, each having a unique name. A row in a table represents a relationship among a set of values. Thus a table represents a collection of relationships.

A relational database normally is considered to have two primary components. First, a relational database has a database scheme, which is the logical design of how data is organized withing the database. The database scheme includes the names of the tables, the names of the fields (or columns) within each table, and the attributes of the fields (e.g., text, numeric, date, etc.). Second, a relational database has a database instance, which is the data in the database at a point in time.

Despite the benefits of relational databases, most case management systems for personal injury plaintiff's law offices use simpler, hierarchical databases. Even those which have utilized relational databases have done so in a limited fashion. Without a well-designed relational database, a case management system for personal injury plaintiff's law offices requires double-entry of data and the case management system can be unable to handle the complex nature of the case's data. Without the ability to easily enter data, without the ability to enter certain types of data, and without the ability to logically organize the data, such systems have provided very limited benefit and have therefore seen limited commercial success.

SUMMARY OF THE INVENTION

The previously described problems are solved in an electronic case manager for a personal injury plaintiffs law office in which client and defendant level data related to an injury incident are collected and organized in an efficient manner. The electronic case manager includes a relational database having a number of tables and a case management program for interfacing with a user to receive data, manage the data and to provide output.

The electronic case manager for a personal injury plaintiffs law office includes a data structure programmed and arranged for classifying data in a relational structure and a database manager programmed and arranged for managing the data structure to allow users to generate documents on the output device.

The relational structure comprises a plurality of tables, the tables comprising plural records relating to personal injury-causing incidents. Each record comprises at least one field. The tables of the relational structure include:

- a clients table for storing information about clients in client records,
- a defendants table for storing information about prospective and actual defendants for claims by law office clients for personal injuries in defendant records,
- an insurers table for storing information about insurers in insurer records,
- an attorneys table for storing information storing about defense and insurance attorneys in attorney records,
- an incidents table for storing information about injury-causing incidents in incidents records,
- a property damage table for storing information about property damage in property damage records,
- a loss of earning table for storing information about loss of earnings in loss of earnings records,
- a medical bills table for storing information about medical bills in medical bills records,
- a witnesses table for storing information about witnesses in witness records,
- an expert witnesses table for storing information about expert witnesses in expert witness records,
- an evidence table for storing information about evidence in evidence records,
- a litigation table for storing information about litigation in litigation records,
- depositions table for storing information about depositions in deposition records,
- a discovery table for storing information about discovery in discovery records,
- a motions table for storing information about motions in motion records,
- a costs table for storing information about costs in costs records,
- an arbitrations table for storing information about arbitrations in arbitration records, and
- a police reports table for storing information about police reports in police report records.

The tables are linked through certain identical fields. The links include a file number field included in and required in the records of the clients table, the defendants table, the insurers table, the attorneys table, the incidents table, the property damage table, the loss of earning table, the medical bills table, the witnesses table, the expert witnesses table, the evidence table, the litigation table, the depositions table, the discovery table, the motions table, the costs table, the arbitrations table and the police reports table, the file number field comprising a unique reference number for referencing incidents. Another link is through a client name field included in and required in the records of the clients table, the loss of earning table, the medical bills table, the discovery table and the costs table, the client name field comprising a client's name and is unique in each table for each file number.

The database manager includes instructions for merging data stored in records in the tables with document templates in accordance with predefined merge rules. The database manager manages the relational data structure in accordance with predefined structure rules. These structure rules include:

- for each incident there will be at least one client record,
- for each incident there will be at least one defendant record,
- for each incident there will be at least one insurer record,
- for each incident there may be one or more attorney records,
- for each incident there will be only one incident record,
- for each incident there may be one or more property damage records,
- for each incident there may be one or more loss of earnings records,
- for each incident there may be one or more medical bills records,
- for each incident there may be one or more witness records,
- for each incident there may be one or more expert witness records,
- for each incident there may be one or more evidence records,
- for each incident there may be one litigation record,
- for each incident there may be one or more deposition records,
- for each incident there may be one or more discovery records,
- for each incident there may be one or more motion records, and
- for each incident there may be one or more costs records.

Still further objects and advantages attaching to the device and to its use and operation will be apparent to those skilled in the art from the following particular description.

DESCRIPTION OF THE DRAWINGS

Further objects of this invention, together with additional features contributing thereto and advantages accruing therefrom, will be apparent from the following description of a preferred embodiment of the present invention which is shown in the accompanying drawings with like reference numerals indicating corresponding parts throughout and which is to be read in conjunction with the following drawings, wherein:

FIG. 5A is a screen shot of a client record data entry screen in accordance with the invention.

FIG. 5B is a screen shot of a settlement data entry screen in accordance with the invention.

FIG. 7 is a screen shot of a insurer record data entry screen in accordance with the invention.

FIG. 8 is a screen shot of an attorney record data entry screen in accordance with the invention.

FIG. 9 is a screen shot of an incident record data entry screen in accordance with the invention.

FIG. 10 is a screen shot of a property damage record data entry screen in accordance with the invention.

FIGS. 12A and 12B are screen shots of medical bills record data entry screens in accordance with the invention.

FIG. 14 is a screen shot of an expert witness record data entry screen in accordance with the invention.

FIG. 15 is a screen shot of a evidence record data entry screen in accordance with the invention.

FIG. 16 is a screen shot of a litigation record data entry screen in accordance with the invention.

FIG. 20 is a screen shot of a cost record data entry screen in accordance with the invention.

FIG. 23 is a screen shot of a body shop record data entry screen in accordance with the invention.

FIG. 24 is a screen shot of an attorney contact record data entry screen in accordance with the invention.

FIG. 25 is a screen shot of an adjuster contact record data entry screen in accordance with the invention.

FIG. 26 is a screen shot of an expert contact record data entry screen in accordance with the invention.

FIG. 28 is a screen shot of an arbitrator contact record data entry screen in accordance with the invention.

FIG. 30 is a screen shot of a firm attorney record data entry screen in accordance with the invention.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

The invention is embodied in Personal Injury Powertool, published by HiPerSoft Corporation (Long Beach, Calif.) and first sold on or after Jun. 9, 1997. The substance, functionality, screens, documentation, and on-line help of the P.I. Powertool are incorporated herein by reference.

Figure 1:
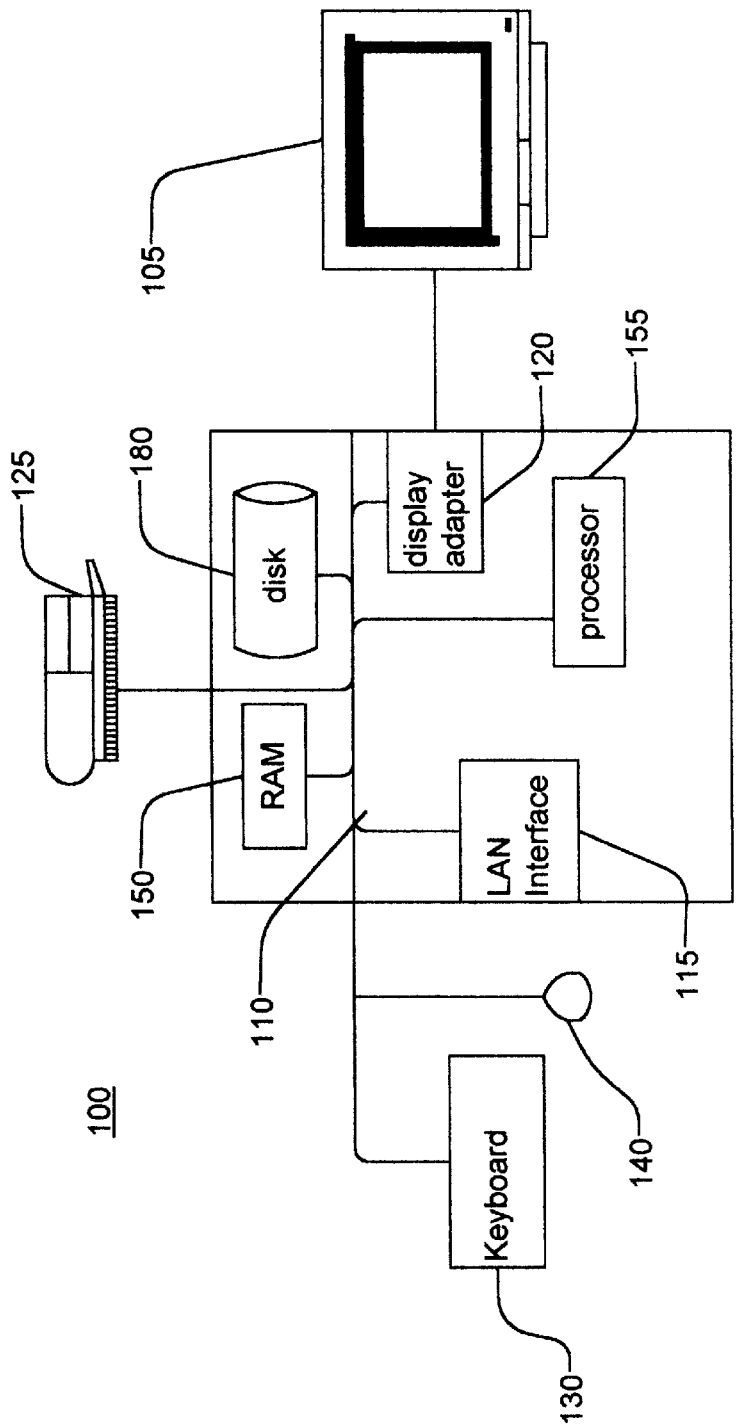
FIG. 1 is a block diagram of a general purpose computer in accordance with the invention.

FIG. 1 shows a general purpose computer 100. The computer 100 preferably includes an Intel Corporation (San Jose, Calif.) processor 155 and runs a Microsoft Corporation (Redmond, Wash.) Windows operating system. In conjunction with the processor 155, the computer 100 has a short term memory 150 (preferably RAM) and a long term memory 180 (preferably a hard disk) as known in the art. The computer 100 further includes a LAN interface 115, a display 105, a display adapter 120, a keyboard 130, a mouse 140, a bus 110 and a printer 125 as known in the art.

Before proceeding, a few terms are defined. By "software" it is meant one or more computer interpretable programs and/or modules related and preferably integrated for performing a desired function. By "document" it is meant a named, structural unit of text, graphics and/or other data that can be stored, retrieved and exchanged among systems and users as a separate unit. By "case" it is meant. By "incident" it is meant the action or event which gave rise to the injuries for which the law firm's client seeks compensation, and could be, for example, a car accident, a dog bite, a slip and fall, or an assault and batter. By "client" it is meant a client of the law firm who the law firm is representing with respect to the client's claim arising from an incident. By "defendant" it is meant a party which is potentially liable for a client's damages, and encompasses such parties regardless of whether the client sues the party.

The most time consuming process in the practice of law involves the preparation of various documents. In accordance with the invention, various databases are defined and used in conjunction with form documents to easily, efficiently, and quickly prepare documents. Two types of documents are produced in accordance with the invention: Judicial Council forms and custom forms. Both Judicial Council forms and custom forms can be created by the user with one or two keystrokes or mouse clicks. In most cases, the user need only select the type of document to be prepared and the client from a list and the document is automatically generated with all necessary information.

The Judicial Council forms are grouped as follows: General, Pleading, Discovery, Case Management, Los Angeles County, Miscellaneous, Case Management, and DMV. Other forms include letters to clients, medical providers, insurance companies, witnesses and opposing attorneys.

When preparing forms in accordance with the invention, the electronic case manager of the invention gathers data from a relational database. Because the program generates output dynamically as desired by a user, the output will reflect the current state of the relational database in the electronic case manager.

Overview of the Tables

Figure 2:
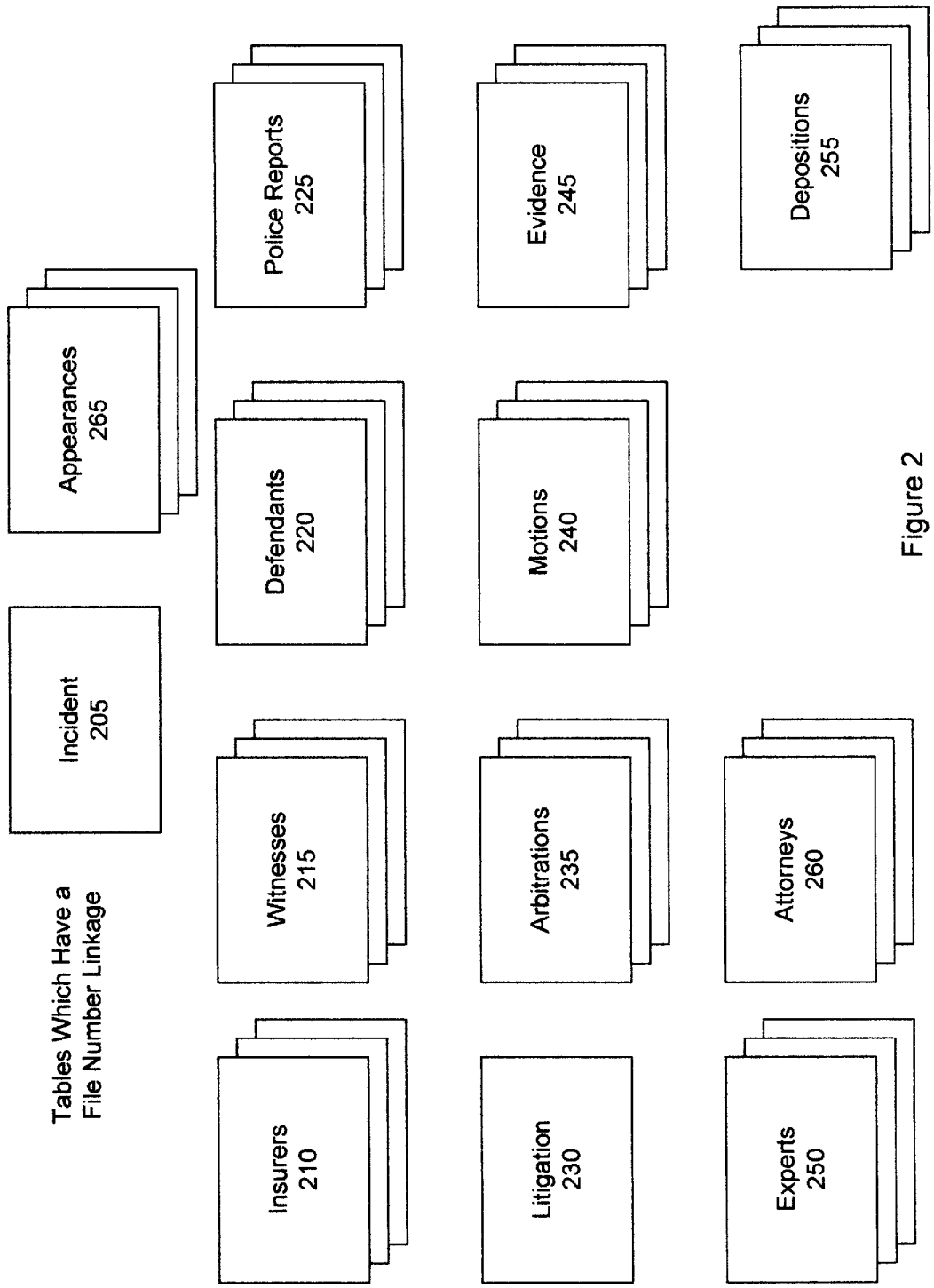
FIG. 2 is a diagram of relational database tables having file number linkages in accordance with the invention.
Figure 3:
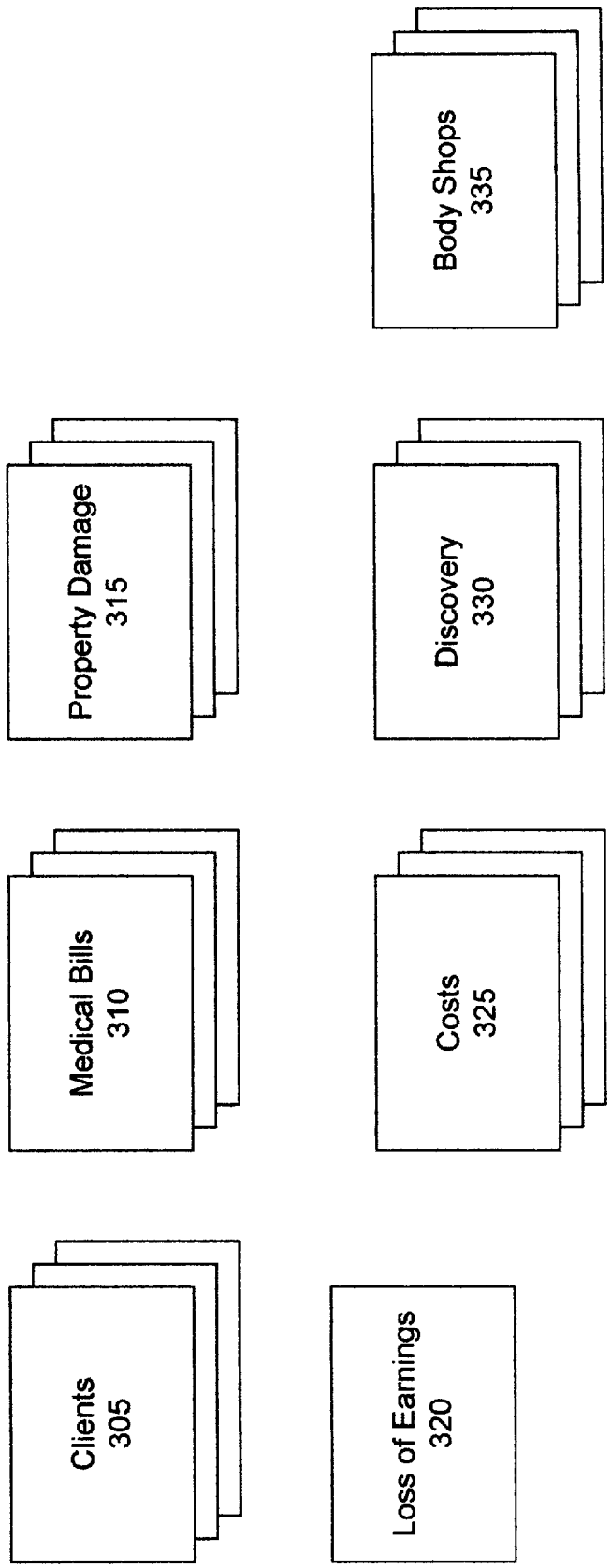
FIG. 3 is a diagram of relational database tables having file number and client name linkages in accordance with the invention.
Figure 4:
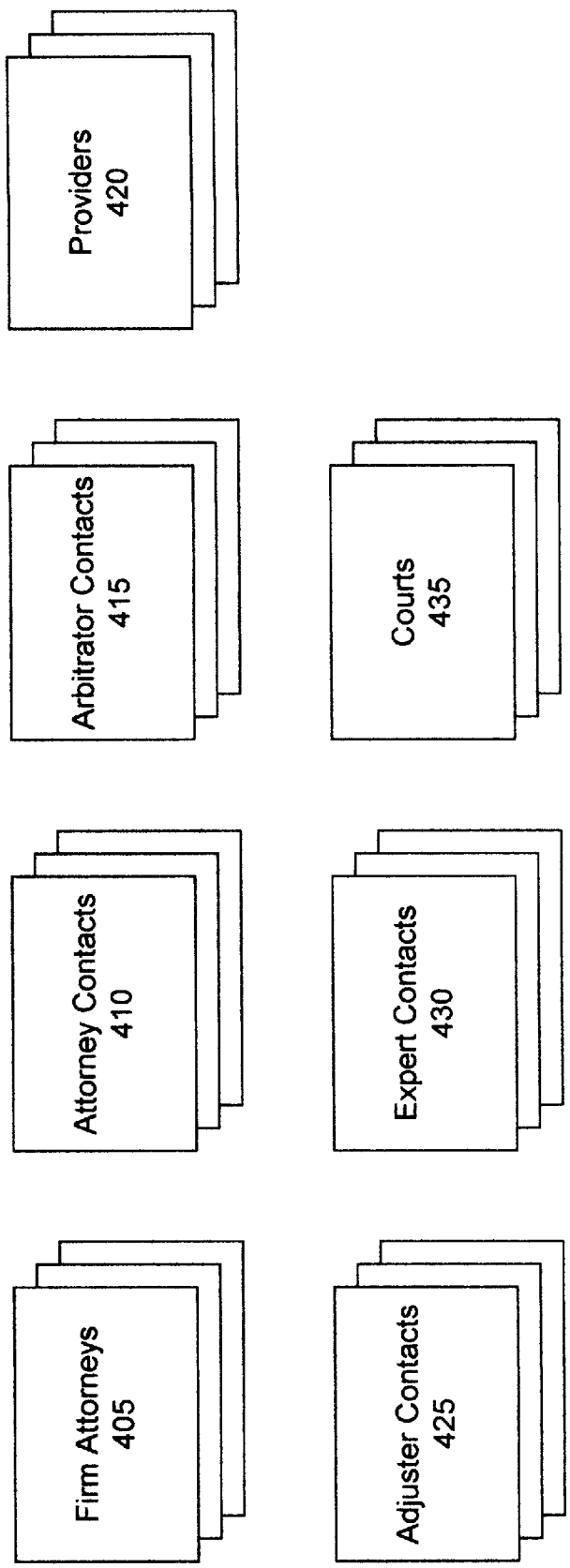
FIG. 4 is a diagram of relational database tables having linkages other than file number in accordance with the invention.

The block diagrams of FIGS. 2–4 collectively show an electronic case manager relational database in accordance with the invention.

The database includes the tables shown in Tables IA, IB and IC. These tables include columns identifying the tables of the data structure of the invention, a description of the data stored in the table, the table's essentiality, and the corresponding reference number in FIGS. 2–4. The tables of Table IA are shown in FIG. 2. The tables of Table IB are shown in FIG. 3. The tables of Table IC are shown in FIG. 4. Table IA lists the tables which store records specific to incidents where the primary linkage is by an incident key.

Table IB lists the tables which store records specific to incidents where the primary linkage is by incident key plus a client key. Table IC lists the tables which store records which are not specific to incidents, and are also not specific to clients.

In the following tables, the fourth column is labeled "Essential?" If there is a check in this column, then the table (or field in the case of Tables II through XXVI) in that row is an essential part of the data structure of the invention. However, while a given table or field may be essential, a user need not necessarily enter data in that table or field.

In some cases, a table may not be marked as essential, but one or more of the fields in the table may be marked as essential. In this circumstance, the table is not considered to be essential, but if the table is included, then the marked fields are essential.

TABLE IA

| Table Name | Description | Reference | Essential? |
|---|---|---|---|
| defendants | information about prospective and actual defendants for claims by law office clients for personal injuries | 220 | ✓ |
| insurers | information about insurers | 210 | ✓ |
| attorneys | information storing about defense and insurance attorneys | 260 | ✓ |
| incidents | information about injury-causing incidents | 205 | ✓ |
| witnesses | information about witnesses | 215 | ✓ |
| expert witnesses | information about expert witnesses | 250 | ✓ |
| evidence | information about evidence | 245 | ✓ |
| litigation | information about litigation | 230 | ✓ |
| depositions | information about depositions | 255 | ✓ |
| motions | information about motions | 240 | ✓ |
| arbitrations | information about arbitrations | 235 | ✓ |
| police reports | information about police reports | 225 | ✓ |
| appearances | information about court appearances | 265 | |

TABLE IB

| Table Name | Description | Reference | Essential? |
|---|---|---|---|
| clients | information about clients | 305 | ✓ |
| property damage | information about property damage | 315 | ✓ |
| discovery | information about discovery | 330 | ✓ |
| loss of earnings | information about loss of earnings | 320 | ✓ |
| costs | information about court costs | 325 | ✓ |
| medical bills | information about medical bills | 310 | ✓ |
| body shops | information about repair estimates | 335 | ✓ |

TABLE IC

| Table Name | Description | Reference | Essential? |
|---|---|---|---|
| attorney contacts | information about attorneys | 410 | |
| adjuster contacts | information about insurance adjusters | 425 | |
| expert contacts | information about experts who may be retained as expert witnesses | 430 | |
| provider contacts | information about medical care providers | 420 | |
| arbitrator contacts | information about arbitrators sitting on arbitration panels | 415 | |

TABLE IC-continued

| Table Name | Description | Reference | Essential? |
|---|---|---|---|
| firm attorneys | information about attorneys in the firm | 405 | |
| courts | information about courts | 435 | |

The tables in Table IC are not essential. However, they are preferably provided to allow for reuse of the indicated data. This reuse may take place across the cases, so none of these tables includes a file number field, as shown further below.

Preferably, data entry screens for the data structure of the invention include editing and ease of use features as known in the art. This includes intelligent field length limiting, automatic formatting of dates, numbers, monetary amounts, etc., drop-down lists which may or may not be edited depending on the nature of the data, etc.

Information About Each Table

Before describing the individual fields of each table, several fields which appear in the tables are described, including a file number field, name fields, a client ID field, a defendant ID field, and address fields.

The file number field in the various tables, in most law offices, will be the firm's own file number for the case. However, the file number need only be unique for each case, and could even be generated by the database manager.

The various name fields preferably are comprised of a first name, middle name and last name field.

Each client must have a unique client ID field for each case. Each defendant must have a unique defendant ID field for each case. Preferably, the client IDs and defendant IDs are unique amongst each other for each case as well. This permits linkages between the insurers table and discovery tables. Alternatively, for tables which might have an ID field which could be filled by a client ID or a defendant ID, flags may be provided to indicate whether an ID is a client ID or a defendant ID, or separate fields may be provided for client ID and defendant ID.

The various address fields are preferably comprised of a street address field, a state field, a city field, a zip code field, and one or more phone number fields.

Turning now to the tables, the fields in the clients table 305 are shown in Table II. These fields and additional fields are shown in FIGS. 5A and 5B and will be appreciated by those of skill in the art. The client table must be linked to the incident table. Preferably, this linkage is arranged by including a file number field in the client table.

TABLE II

Clients Table Structure

| Field Name | Description | Reference | Essential? |
|---|---|---|---|
| file number | an identifier of the case - unique | 509 | ✓ |
| client ID | an identifier of the client - unique to the client's case | | ✓ |
| name | a client's name | 501 | ✓ |
| address | the client's address | 502 | ✓ |
| date of birth | the client's date of birth | 503 | ✓ |
| first government identification | a government-issued identification number, preferably a drivers license number | 504 | ✓ |
| second government identification | a government-issued identification number, preferably a social security number | 505 | ✓ |
| salutation | a salutation or greeting to use on letters to the client | 506 | ✓ |

TABLE II-continued

Clients Table Structure

| Field Name | Description | Reference | Essential? |
|---|---|---|---|
| event type | the type of event which led to the client's injury; preferably selected from a list | 507 | ✓ |
| assigned attorney | an identifier of the firm's attorney who is assigned to represent the client | 508 | ✓ |
| ready to settle | whether the client is ready to settle | 510 | |
| demand letter sent | the date when a demand letter was sent on behalf of the client | 511 | |
| settlement type | the type of settlement sought | 512 | |
| settlement date | the date upon which the settlement consummated | 513 | ✓ |
| contingent fee | a number representing the percentage of the offer paid to the attorney | 514 | ✓ |
| offer | the amount offered by defendants to settle the case | 515 | ✓ |

Figure 6:
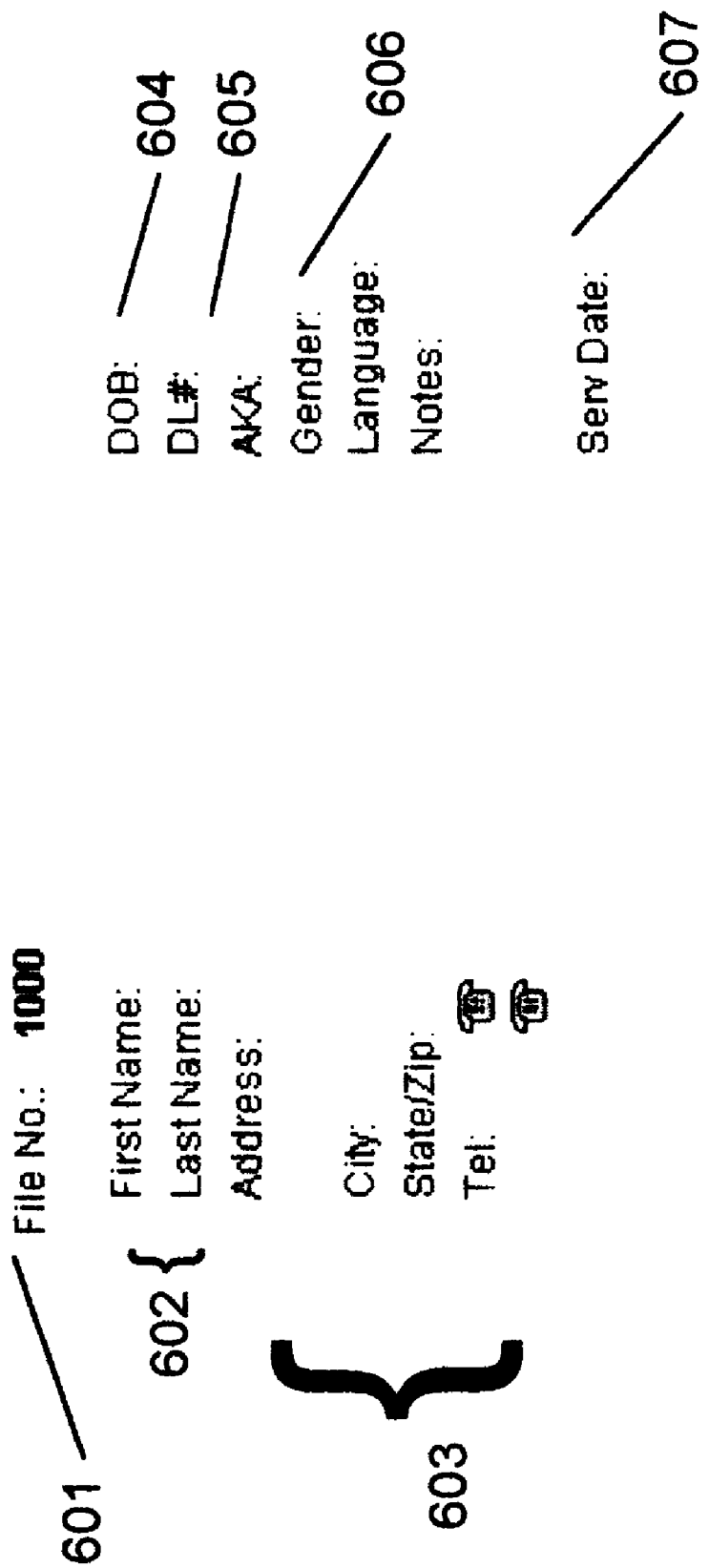
FIG. 6 is a screen shot of a defendant record data entry screen in accordance with the invention.

The fields in the defendants table 220 are shown in Table III. These fields and additional fields are shown in FIG. 6 and will be appreciated by those of skill in the art.

TABLE III

Defendant Table Structure

| Field Name | Description | Reference | Essential? |
|---|---|---|---|
| defendant ID | an identifier of the defendant which is unique to the case | | ✓ |
| file number | an identifier of the case - unique | 601 | ✓ |
| name | a defendant's name | 602 | ✓ |
| address | the defendant's address | 603 | ✓ |
| date of birth | the defendant's date of birth | 604 | |
| government identification | a government-issued identification number, preferably a drivers license number | 605 | |
| entity type | the defendant's legal entity: preferably selected from a list which includes male, female and corporate | 606 | ✓ |
| service date | the date when the defendant was served with a complaint | 607 | ✓ |

The fields in the insurers table 210 are shown in Table IV. These fields and additional fields are shown in FIG. 7 and will be appreciated by those of skill in the art.

TABLE IV

Insurer Table Structure

| Field Name | Description | Reference | Essential? |
|---|---|---|---|
| file number | an identifier of the case - unique | 701 | ✓ |
| insured name | the name of the party covered by the referenced insurance policy | 702 | ✓ |
| adjuster name | the adjuster's name who is assigned to the case | 703 | ✓ |
| policy number | the policy number of the insured's insurance policy | 704 | ✓ |
| claim number | the claim number assigned to the case by the insurance company | 705 | ✓ |
| policy limits | the monetary limits of the insurance policy | 706 | ✓ |
| medical payments | contributions toward payment of medical expenses under policy | 707 | |
| reimbursement | indicates whether medical payments must be reimbursed | 708 | |

TABLE IV-continued

Insurer Table Structure

| Field Name | Description | Reference | Essential? |
|---|---|---|---|
| rental car | whether a vehicle insurance policy provides for rental car reimbursement | 709 | |
| uninsured motorist | whether the policy provides coverage for damage caused by uninsured motorists | 710 | ✓ |
| uninsured motorist limits | the policy limits for uninsured motorist coverage | 711 | |

The fields in the attorneys table 260 are shown in Table V. These fields and additional fields are shown in FIG. 8 and will be appreciated by those of skill in the art.

TABLE V

Attorney Table Structure

| Field Name | Description | Reference | Essential? |
|---|---|---|---|
| file number | an identifier of the case - unique | 801 | ✓ |
| attorney ID | the identifier of an attorney involved in the case (not with the firm) | 802 | ✓ |
| party name | the party the attorney represents | 803 | ✓ |

The fields in the incidents table 205 are shown in Table VI. These fields and additional fields are shown in FIG. 9 and will be appreciated by those of skill in the art.

TABLE VI

Incidents Table Structure

| Field Name | Description | Reference | Essential? |
|---|---|---|---|
| file number | an identifier of the case - unique | 901 | ✓ |
| incident date | the date the incident occurred, and preferably also the time | 902 | ✓ |
| incident type | the type of incident | 903 | |
| location | the location of the incident | 904 | ✓ |
| description | a narrative description of the incident | 905 | ✓ |
| code violation | any government laws, regulations, rules or ordinances which were violated | 906 | |
| conditions | relevant conditions to the incident | 907 | |
| prior accidents | information about prior related accidents | 908 | |

Table VI-Incidents Table Structure

The fields in the property damage table 315 are shown in Table VII. These fields and additional fields are shown in FIG. 10 and will be appreciated by those of skill in the art.

TABLE VII

Property Damage Table Structure

| Field Name | Description | Reference | Essential? |
|---|---|---|---|
| file number | an identifier associated with the case - unique | 1001 | ✓ |
| client ID | an identifier of the client - unique to the client's case | 1002 | ✓ |

TABLE VII-continued

Property Damage Table Structure

| Field Name | Description | Reference | Essential? |
|---|---|---|---|
| type/year | the type and year of the client's vehicle | 1003 | ✓ |
| plate | the vehicle's license plate number | 1004 | |
| owner | the name of the vehicle's registered owner | 1005 | ✓ |
| photos | a narrative description of the photos of property damage | 1006 | |
| description | a narrative description of the damage to the vehicle | 1007 | |
| mileage | the vehicle's odometer reading at the time of the incident | 1008 | |

Figure 11:
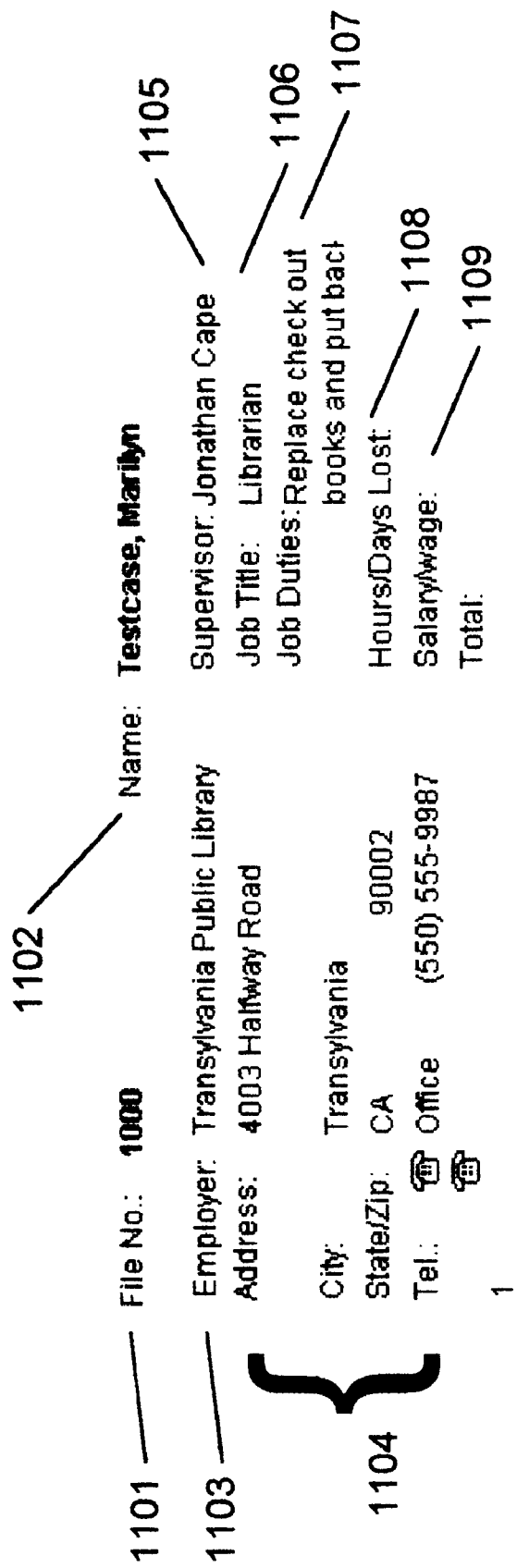
FIG. 11 is a screen shot of a loss of earnings record data entry screen in accordance with the invention.

The fields in the loss of earnings table 320 are shown in Table VIII. These fields are shown in FIG. 11 and will be appreciated by those of skill in the art.

TABLE VIII

Loss of Earnings Table Structure

| Field Name | Description | Reference | Essential? |
|---|---|---|---|
| file number | an identifier of the case - unique | 1101 | ✓ |
| client ID | an identifier of the client - unique | 1102 | ✓ |
| employer | the name of the client's employer | 1103 | ✓ |
| address | the employer's address | 1104 | |
| supervisor | the name of the client's supervisor | 1105 | |
| job title | the client's title at work | 1106 | ✓ |
| job duties | narrative description of the client's duties at work | 1107 | |
| lost time | how many hours and/or days of work time the client lost | 1108 | ✓ |
| compensation | the client's hourly or other normal compensation | 1109 | ✓ |

Figure 12B:
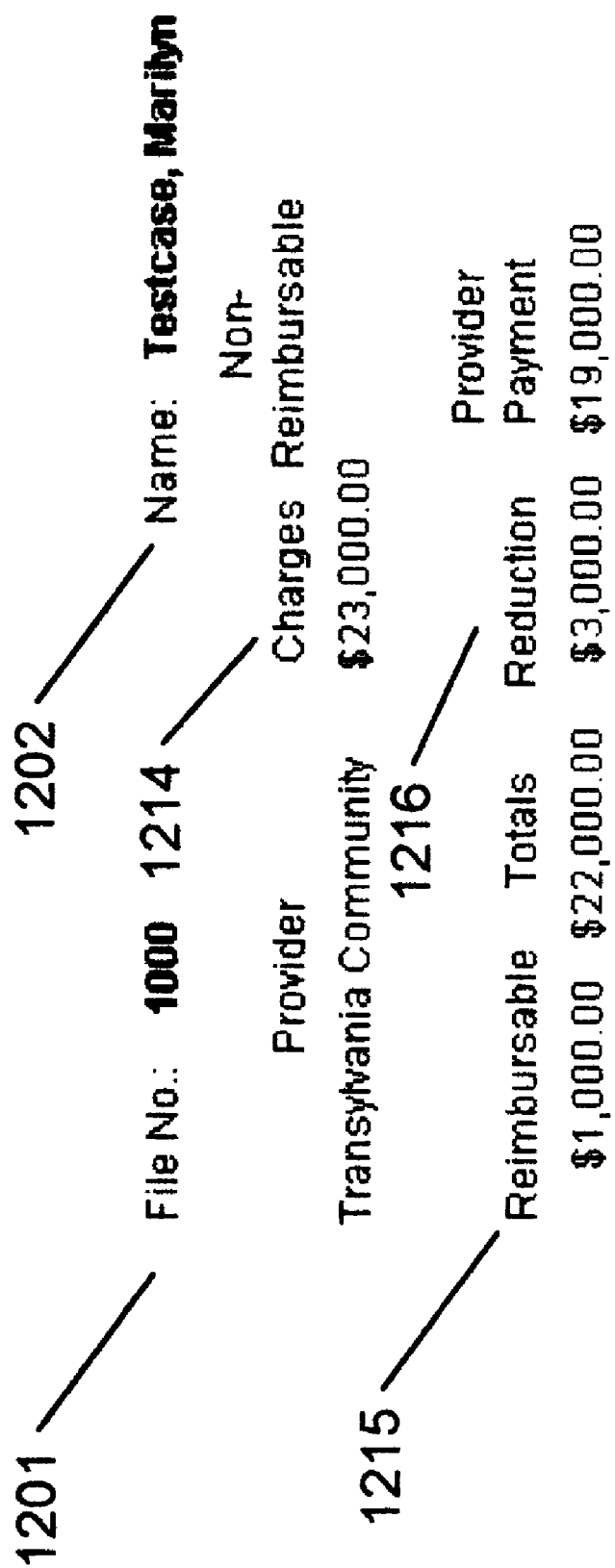

The fields in the medical bills table 310 are shown in Table IX. These fields and additional fields are shown in FIGS. 12A and 12B and will be appreciated by those of skill in the art.

TABLE IX

Medical Bills Table Structure

| Field Name | Description | Reference | Essential? |
|---|---|---|---|
| file number | an identifier of the case - unique | 1201 | ✓ |
| client ID | an identifier of the client - unique to the client's case | 1202 | ✓ |
| provider ID | the identifier of the medical care provider | 1203 | ✓ |
| doctor | the attending doctor's name | 1204 | ✓ |
| first exam | the date of the doctor's first exam of the client | 1205 | |
| final | the date of the doctor's final exam of the client | 1206 | |
| report received | whether the doctor's report has been received by the firm | 1207 | |
| rec received | | 1208 | |
| bill received | whether the medical provider's bill has been received by the firm | 1209 | |
| lien signed | | 1210 | |
| injury | the injury treated by the doctor | 1211 | |
| treatment | the treatment prescribed by the doctor | 1212 | |
| future treatment | future treatments prescribed by the doctor | 1213 | |
| charge | the medical provider's charge | 1214 | ✓ |
| non-reimbursable | the amount of non-reimbursable charges | 1215 | |

TABLE IX-continued

Medical Bills Table Structure

| Field Name | Description | Reference | Essential? |
|---|---|---|---|
| reduction | the amount of discount or other reduction applied to the medical provider's charges | 1216 | |

Figure 13:
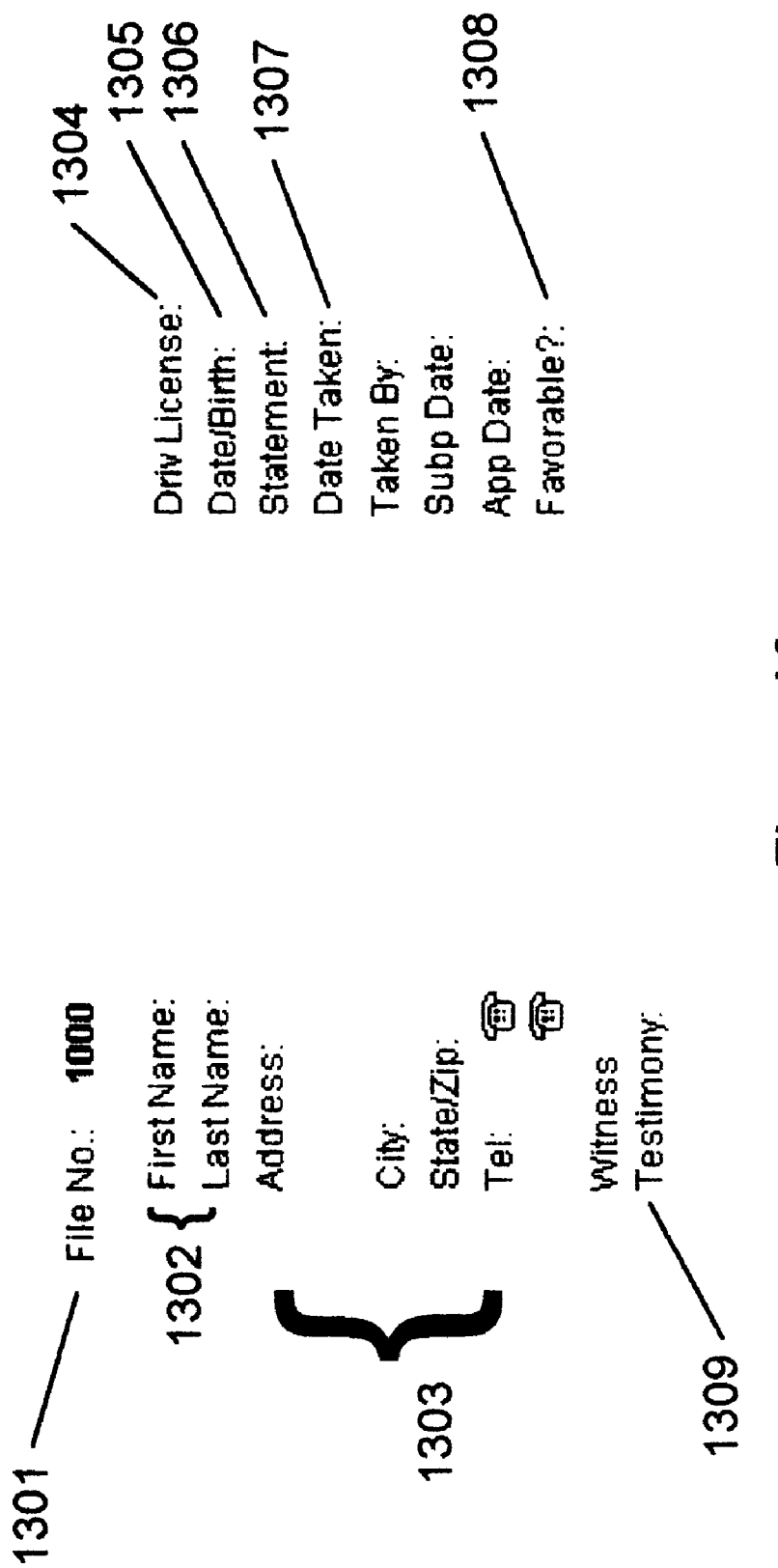
FIG. 13 is a screen shot of a witness record data entry screen in accordance with the invention.

The fields in the witnesses table 215 are shown in Table X. These fields and additional fields are shown in FIG. 13 and will be appreciated by those of skill in the art.

TABLE X

Witnesses Table Structure

| Field Name | Description | Reference | Essential? |
|---|---|---|---|
| file number | an identifier of the case - unique | 1301 | ✓ |
| name | the witness's name | 1302 | ✓ |
| address | the witness's address | 1303 | ✓ |
| government identification | the witness's driver license number | 1304 | |
| date of birth | the witness's date of birth | 1305 | |
| statement | indicates whether a statement was taken from the witness | 1306 | |
| statement date | the date the witness's statement was taken | 1307 | |
| favorable | whether the witness is favorable to the firm's clients | 1308 | |
| testimony | narrative of the witness's testimony | 1309 | ✓ |

The fields in the expert witnesses table 250 are shown in Table XI. These fields and additional fields are shown in FIG. 14 and will be appreciated by those of skill in the art.

TABLE XI

Expert Witnesses Table Structure

| Field Name | Description | Reference | Essential? |
|---|---|---|---|
| file number | an identifier of the case - unique | 1401 | ✓ |
| expert ID | an identifier of the expert witness - unique | 1402 | ✓ |
| opinion | the opinion of the expert witness | 1403 | ✓ |

The fields in the evidence table 245 are shown in Table XII. These fields are shown in FIG. 15 and will be appreciated by those of skill in the art.

TABLE XII

Evidence Table Structure

| Field Name | Description | Reference | Essential? |
|---|---|---|---|
| file number | an identifier of the case - unique | 1501 | ✓ |
| name | the name of the documentary evidence | 1502 | ✓ |
| issue | the issue raised or addressed by the document | 1503 | |
| description | a narrative description of the document | 1504 | ✓ |
| party supported | an identifier of the party (client ID or defendant ID) supported by the document | 1505 | ✓ |
| date received | the date the firm received the document | 1506 | |
| source | the source of the document | 1507 | |
| admissible | whether the document is likely admissible at trial | 1508 | |

TABLE XII-continued

Evidence Table Structure

| Field Name | Description | Reference | Essential? |
|---|---|---|---|
| objections | potential objections to the evidence's admission | 1509 | |
| arguments | the arguments underlying the objections | 1510 | |
| authority | the legal authority for the arguments | 1511 | |
| motions in limine | description of motions in limine anticipated for trial | 1512 | |

The fields in the litigation table 230 are shown in Table XIII. These fields and additional fields are shown in FIG. 16 and will be appreciated by those of skill in the art.

TABLE XIII

Litigation Table Structure

| Field Name | Description | Reference | Essential? |
|---|---|---|---|
| file number | an identifier of case - unique | 1601 | ✓ |
| case number | the case number assigned by the court | 1602 | ✓ |
| court ID | an identifier of the court - unique | 1603 | ✓ |
| trial date | the date for the trial to start | 1604 | |
| trial time | the time when the trial is to start | 1605 | |
| department | the department, division or court room for the trial | 1606 | |
| judge | the judge hearing the case | 1607 | |

Figure 17:
FIG. 17 is a screen shot of a deposition record data entry screen in accordance with the invention.

The fields in the depositions table 255 are shown in Table XIV. These fields and additional fields are shown in FIG. 17 and will be appreciated by those of skill in the art.

TABLE XIV

Depositions Table Structure

| Field Name | Description | Reference | Essential? |
|---|---|---|---|
| file number | an identifier of the case - unique | 1701 | ✓ |
| deponent | the name of the deponent | 1702 | ✓ |
| service date | the name of the deponent | 1703 | ✓ |
| deposition date | the date of the deposition | 1704 | ✓ |
| deposition time | the time of the deposition | 1705 | ✓ |
| document request | a list of documents requested for the deponent to produce at the deposition | 1706 | |
| noticed by | the party noticing the deposition | 1707 | |
| location | the location of the deposition | 1708 | ✓ |

Figure 18:
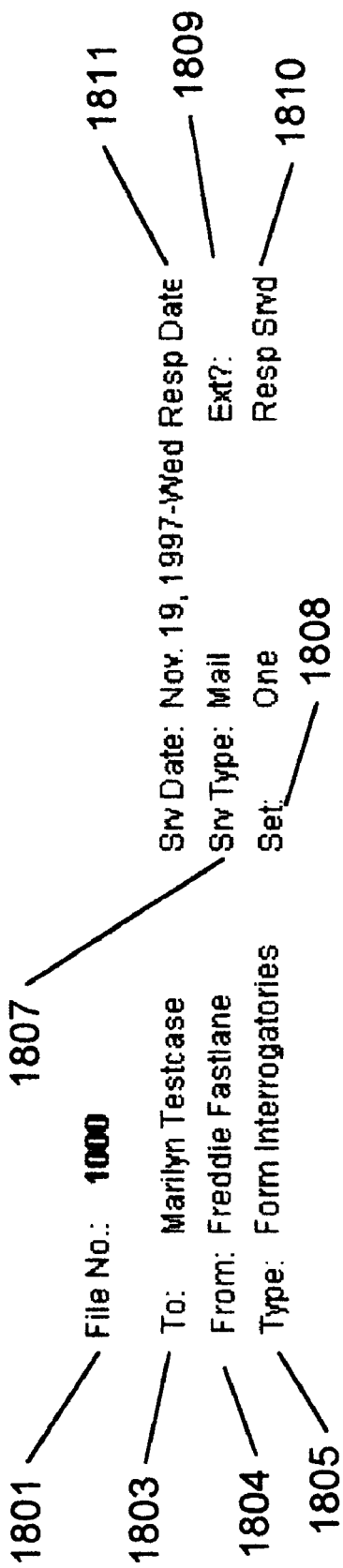
FIG. 18 is a screen shot of a discovery record data entry screen in accordance with the invention.

The fields in the discovery table 330 are shown in Table XV. These fields are shown in FIG. 18 and will be appreciated by those of skill in the art. Although only one discovery table is shown, it is preferred to provide to discovery tables—one table for discovery propounded by a client, and a second table for discovery propounded by a defendant on a client. In such an embodiment, the "from" and "to" fields do not include a defendant ID. Rather, it is preferred to have only the typed name of the defendant in the field.

TABLE XV

Discovery Table Structure

| Field Name | Description | Reference | Essential? |
|---|---|---|---|
| file number | an identifier of the case - unique | 1801 | ✓ |
| to | an identifier of the party (client or defendant) upon whom the discovery was served | 1803 | ✓ |
| from | an identifier of the party (client or defendant) serving the discovery | 1804 | ✓ |
| type | the type of discovery | 1805 | ✓ |
| service date | the date the discovery request was served | 1806 | |
| service type | the type of service | 1807 | |
| set | the set number of the discovery request | 1808 | |
| extension | whether the discovery request is extendable | 1809 | |
| response served | whether the response to the discovery request was served | 1810 | |
| response due | date discovery response is due | 1811 | ✓ |

Figure 19:
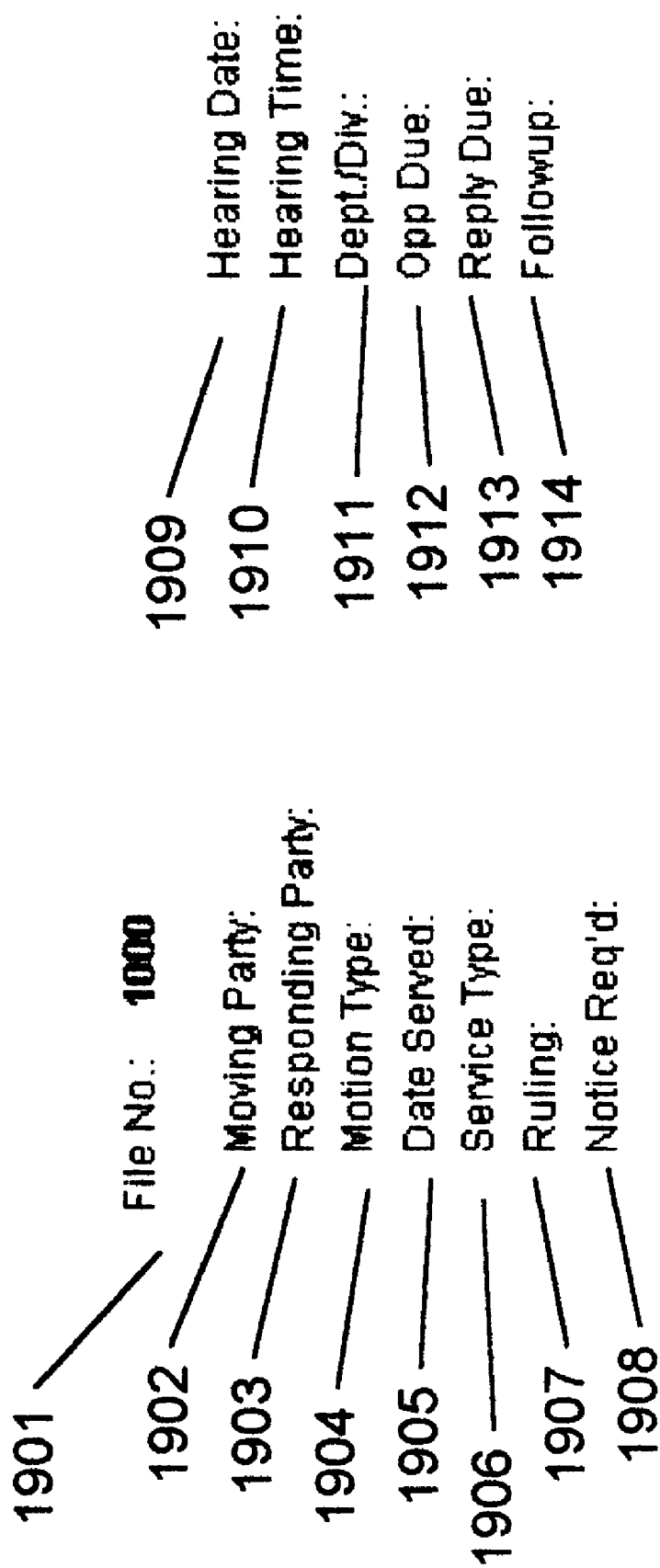
FIG. 19 is a screen shot of a motion record data entry screen in accordance with the invention.

The fields in the motions table 240 are shown in Table XVI. These fields are shown in FIG. 19 and will be appreciated by those of skill in the art.

TABLE XVI

Motions Table Structure

| Field Name | Description | Reference | Essential? |
|---|---|---|---|
| file number | an identifier of the case - unique | 1901 | ✓ |
| moving party ID | an identifier of the moving party (client ID or defendant ID) | 1902 | ✓ |
| responding party ID | an identifier of the responding party (client ID or defendant ID) | 1903 | ✓ |
| motion type | the type of motion | 1904 | ✓ |
| date served | the date the motion served | 1905 | |
| service type | the type of service of the motion | 1906 | |
| ruling | the court's ruling on the motion | 1907 | |
| notice required | indicates whether notice of ruling required to be given | 1908 | |
| hearing date | the hearing date of the motion | 1909 | ✓ |
| hearing time | the hearing time of the motion | 1910 | ✓ |
| department | the department, division or court room for the hearing | 1911 | ✓ |
| opposition due | the date when the opposition to the motion must be filed | 1912 | |
| reply due | the date when the reply to the opposition must be filed | 1913 | |
| follow up | describes subsequent actions required pursuant to court's ruling | 1914 | |

The fields in the costs table 325 are shown in Table XVII. These fields are shown in FIG. 20 and will be appreciated by those of skill in the art.

TABLE XVII

Costs Table Structure

| Field Name | Description | Reference | Essential? |
|---|---|---|---|
| file number | an identifier of the case - unique | 2001 | ✓ |
| client ID | an identifier of the client - unique to the client's case | 2002 | ✓ |
| date | the date the cost was incurred | 2003 | |
| type | the type of expense | 2004 | ✓ |
| description | a narrative description of the expense | 2005 | |

TABLE XVII-continued

Costs Table Structure

| Field Name | Description | Reference | Essential? |
|---|---|---|---|
| charge | the charge for the expense | 2006 | ✓ |
| amount paid | the amount the firm paid | 2007 | |

Figure 21:
FIG. 21 is a screen shot of a arbitration record data entry screen in accordance with the invention.

The fields in the arbitrations table 235 are shown in Table XVIII. These and additional fields are shown in FIG. 21 and will be appreciated by those of skill in the art.

TABLE XVIII

Arbitrations Table Structure

| Field Name | Description | Reference | Essential? |
|---|---|---|---|
| file number | an identifier of the case - unique | 2101 | ✓ |
| hearing date | the date when the arbitration hearing is to start | 2102 | ✓ |
| time | the time when the arbitration hearing is to start | 2103 | ✓ |
| location | the location of the arbitration hearing | 2104 | ✓ |
| arbitrator | the arbitrator's database ID | 2105 | ✓ |

Figure 22:
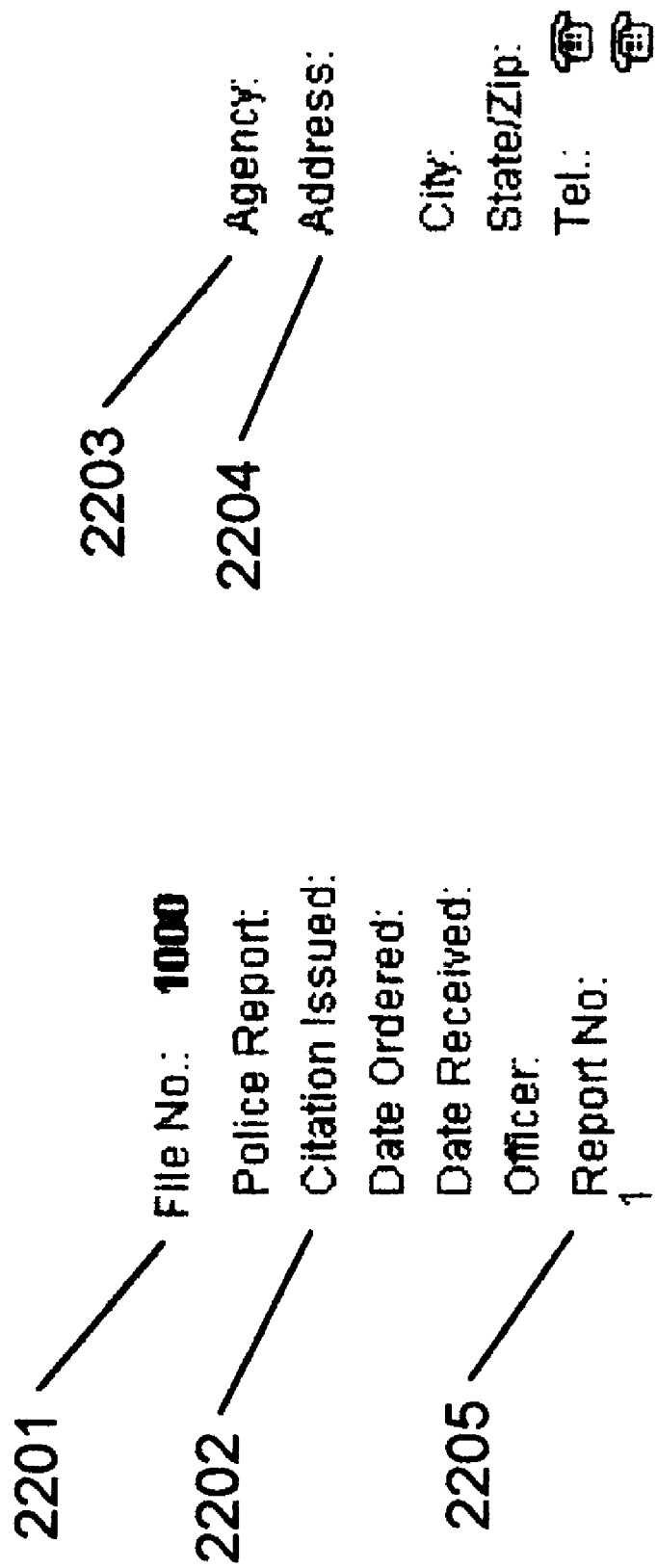
FIG. 22 is a screen shot of a police report record data entry screen in accordance with the invention.

The fields in the police reports table 225 are shown in Table XIX. These and additional fields are shown in FIG. 22 and will be appreciated by those of skill in the art.

TABLE XIX

Police Reports Table Structure

| Field Name | Description | Reference | Essential? |
|---|---|---|---|
| file number | an identifier of the case - unique | 2201 | ✓ |
| citation issued | indicates whether a citation was issued by the investigating agency | 2202 | |
| agency | the name of the agency issuing the citation | 2203 | ✓ |
| address | the address of the citing agency | 2204 | ✓ |
| report number | number of report assigned by agency | 2205 | ✓ |

The fields in the body shops table 335 are shown in Table XX. These and additional fields are shown in FIG. 23 and will be appreciated by those of skill in the art.

TABLE XX

Body Shops Table Structure

| Field Name | Description | Reference | Essential? |
|---|---|---|---|
| file number | an identifier of the case - unique | 2301 | ✓ |
| client ID | an identifier of the client - unique to the client's case | 2305 | ✓ |
| name | the name of the body shop | 2302 | ✓ |
| vehicle ID | the license plate or VIN of the client's vehicle | 2303 | ✓ |
| estimate | the body shop's estimate to repair the client's vehicle | 2304 | ✓ |

The fields in the attorney contacts table 410 are shown in Table XXI. These fields are shown in FIG. 24 and will be appreciated by those of skill in the art.

TABLE XXI

Attorney Contacts Table Structure

| Field Name | Description | Reference | Essential? |
|---|---|---|---|
| attorney ID | an identifier of the attorney - unique | | ✓ |
| attorney name | the attorney's name | 2401 | ✓ |
| firm | the name of the attorney's firm | 2402 | ✓ |
| salutation | a salutation or greeting for use in letters to the attorney | 2403 | ✓ |
| address | the attorney's address | 2404 | ✓ |
| secretary | the name of the attorney's secretary | 2405 | |

The fields in the adjuster contacts table 425 are shown in Table XXII. These fields are shown in FIG. 25 and will be appreciated by those of skill in the art.

TABLE XXII

Adjuster Contacts Table Structure

| Field Name | Description | Reference | Essential? |
|---|---|---|---|
| adjuster ID | an identifier of the adjuster - unique | | ✓ |
| adjuster | the name of the insurance adjuster | 2501 | ✓ |
| company | the adjuster's insurance company | 2502 | ✓ |
| salutation | a salutation of greeting for use in letters to the adjuster | 2503 | ✓ |
| address | the adjuster's address | 2504 | ✓ |
| manager | the name of the adjuster's manager | 2505 | |
| supervisor | the name of the adjuster's supervisor | 2506 | |

Figure 26:
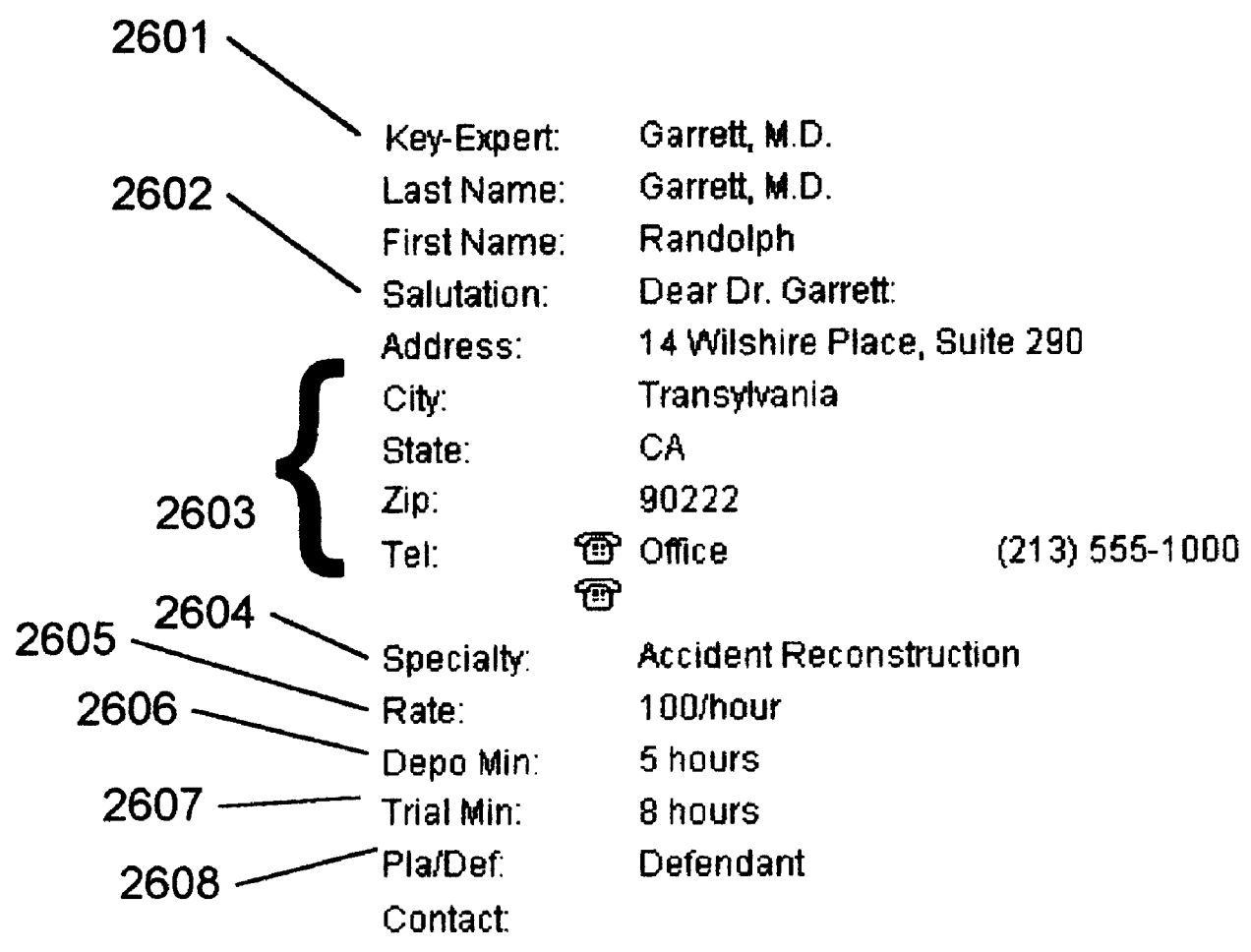

The fields in the expert contacts table 430 are shown in Table XXIII. These and additional fields are shown in FIG. 26 and will be appreciated by those of skill in the art.

TABLE XXIII

Expert Contacts Table Structure

| Field Name | Description | Reference | Essential? |
|---|---|---|---|
| expert ID | a unique identifier of the expert | | ✓ |
| name | the expert's name | 2601 | ✓ |
| salutation | a salutation or greeting for use in letters to the expert | 2602 | ✓ |
| address | the expert's address | 2603 | |
| specialty | the expert's specialty | 2604 | ✓ |
| rate | the expert's billing rate | 2605 | |
| deposition min. | the minimum charged by the expert for a deposition | 2606 | |
| trial min. | the minimum charged by the expert for a day of trial | 2607 | |
| side | whether the expert normally represents plaintiffs or defendants | 2608 | |

Figure 27:
FIG. 27 is a screen shot of a medical provider contact record data entry screen in accordance with the invention.

The fields in the medical provider contacts table 420 are shown in Table XXIV. These and additional fields are shown in FIG. 27 and will be appreciated by those of skill in the art.

TABLE XXIV

Medical Provider Contacts Table Structure

| Field Name | Description | Reference | Essential? |
|---|---|---|---|
| medical provider ID | a unique identifier | | ✓ |
| medical provider | the name of the medical services provider | 2701 | ✓ |
| address | the medical provider's address | 2702 | |
| contact | the name of a contact at the medical provider | 2703 | |

The fields in the arbitrator contacts table 415 are shown in Table XXV. These and additional fields are shown in FIG. 28 and will be appreciated by those of skill in the art.

TABLE XXV

Arbitrator Contacts Table Structure

| Field Name | Description | Reference | Essential? |
|---|---|---|---|
| arbitrator | the arbitrator's database ID | 2801 | ✓ |
| name | the arbitrator's name | 2802 | ✓ |
| address | the arbitrator's address | 2803 | |
| contact | person at office of arbitrator through whom arrangements made | 2804 | |
| panel name | the name of the panel through which the arbitrator makes arrangements | 2805 | |
| salutation | a salutation or greeting to use in letters to the arbitrator | 2806 | ✓ |

The fields in the firm attorneys table 405 are shown in Table XXVI. These and additional fields are shown in FIG. 30 and will be appreciated by those of skill in the art.

TABLE XXVI

Firm Attorneys Table Structure

| Field Name | Description | Reference | Essential? |
|---|---|---|---|
| attorney ID | an identifier of the attorney - unique | | ✓ |
| attorney name | the attorney's name | 3001 | ✓ |

Figure 31:
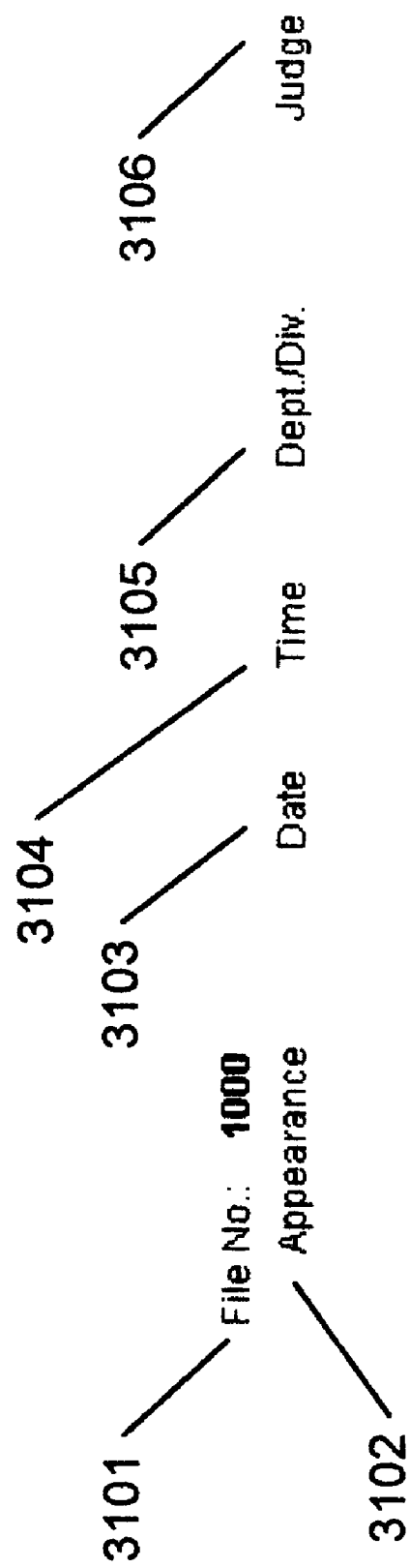
FIG. 31 is a screen shot of an appearances record data entry screen in accordance with the invention.

The fields in the appearances table 265 are shown in Table XXVII. These fields are shown in FIG. 31 and will be appreciated by those of skill in the art.

TABLE XXVII

Appearances Table Structure

| Field Name | Description | Reference | Essential? |
|---|---|---|---|
| file number | an identifier of the case - unique | 3101 | ✓ |
| appearance | the name of the hearing for which the attorney must appear | 3102 | ✓ |
| date | the date of the appearance | 3103 | ✓ |
| time | the time of the appearance | 3104 | ✓ |
| department | the courtroom in which the hearing has been scheduled | 3105 | |
| judge | the judge who will preside over the scheduled hearing | 3106 | |

Figure 32:
FIG. 32 is a screen shot of a courts record data entry screen in accordance with the invention.

The fields in the courts table 435 are shown in Table XXVIII. These fields are shown in FIG. 32 and will be appreciated by those of skill in the art.

TABLE XXVIII

Courts Table Structure

| Field Name | Description | Reference | Essential? |
|---|---|---|---|
| court ID | an identifier of the court - unique | 3201 | ✓ |
| county | the county where the court sits | 3202 | ✓ |
| jurisdiction | the name of the court's jurisdiction | 3203 | ✓ |
| district | the name of the court's district | 3204 | ✓ |
| covered cities | a description of the court's jurisdiction | 3205 | |
| address | the court's address | 3206 | |

Table Linkages

Tables preferably linked by file number field: clients, incidents, insurers, witnesses, defendants, police reports, litigation, arbitrations, motions, evidence, expert witnesses, attorneys, depositions, medical bills, property damage, loss of earnings, costs, discovery, body shops, appearances.

Tables preferably linked by client ID field: clients, medical bills, property damage, loss of earnings, costs, insurers (through insured ID field), evidence (through party supported field), depositions (through noticed by field), discovery (through to and from fields), motions (through moving party field and responding party field).

Tables preferably linked by attorney assigned field: clients, firm attorneys (through attorney ID field).

Tables preferably linked by adjuster ID field: insurers, adjuster contacts.

Tables which could be linked by defendant ID field: defendants, insurers (through insured ID field), evidence (through party supported field), depositions (through noticed by field), discovery (through to and from fields), motions (through moving party field and responding party field).

Tables preferably linked by attorney ID field: attorneys, attorney contacts.

Tables preferably linked by medical provider ID field: medical bills, medical providers.

Tables preferably linked by expert ID field: expert witnesses, expert contacts.

Tables preferably linked by arbitrator ID field: arbitrations, arbitrator contacts.

Tables preferably linked by court ID field: litigation, courts.

Several of the tables have very similar fields, but are not linked. For example, the attorney contacts table, the adjuster contacts table, the experts contacts table and the arbitrator contacts table include name, address and salutation fields, but are not linked. These tables could be embodied as a single contact table having the fields of all of the tables, plus a field which indicates the type of contact.

Database Manager

In conjunction with the data structure described above, the electronic case manager for a personal injury plaintiffs law office includes a database management program having instructions and arranged for managing the data structure to allow users to generate documents on an output device such as display 105 or printer 125.

Figure 29:
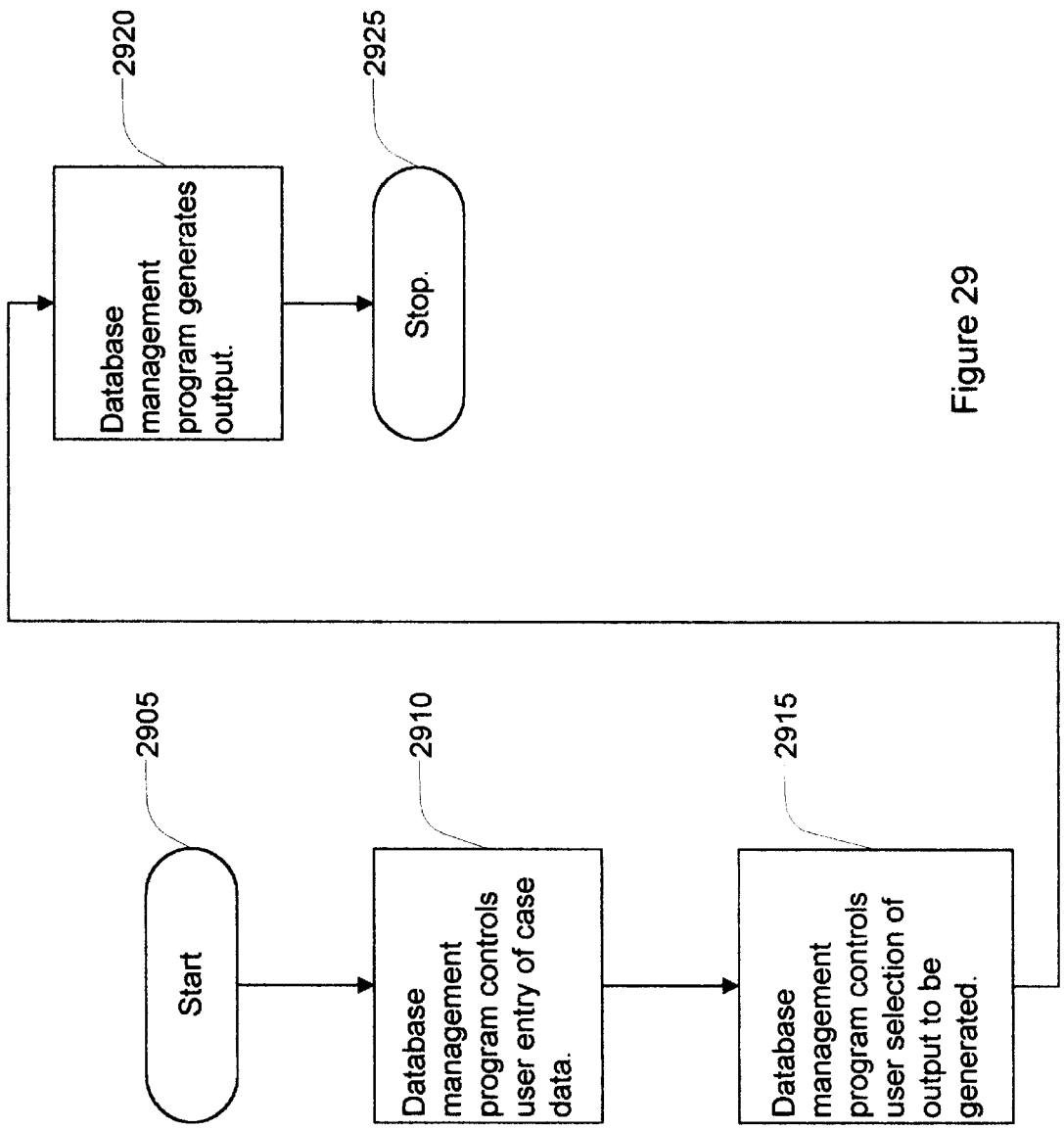
FIG. 29 is a flowchart of a method of generating documents in accordance with the invention.

The operation of the database management program is further described with reference to FIG. 29. After the database management program is started (step 2905), the database management program provides prompts and controls the input of data by a user and stores the data in the long term memory 180 (step 2910). Next, the database management program provides prompts for the user to select an output (e.g., an analytical report or a form document) and controls the user's input of criteria data to be used by the database management program to generate the output (step 2915). The database management program next generates the desired output (step 2920), and processing is complete (step 2925).

The electronic case manager manages the data structure in accordance with predefined structure rules in the database management program. Some of these structure rules are also evident from FIGS. 2–4, wherein some tables are shown as a single box, to show one record in that table per case, and other tables are shown as staggered boxes, to show multiple possible records in that table per case. The structure rules include:

For each case there will be only one linked incident record.

For each incident record there will be at least one linked client record.

For each incident record there will be at least one linked defendant record.

For each incident record there will be at least one linked insurer record.

For each incident record there may be one or more linked attorney records.

For each incident record there may be one or more linked property damage records.

For each incident record there may be one or more linked loss of earnings records.

For each incident record there may be one or more linked medical bills records.

For each incident record there may be one or more linked witness records.

For each incident record there may be one or more linked expert witness records.

For each incident record there may be one or more linked evidence records.

For each incident record there may be only one linked litigation record.

For each incident record there may be one or more linked deposition records.

For each incident record there may be one or more linked discovery records.

For each incident record there may be one or more linked motion records.

For each incident record there may be one or more linked costs records.

For each incident record there may be one or more linked police report records.

For each incident record there may be one or more linked arbitration records.

For each incident record there may be one or more linked body shop records.

For each client record there may be one or more linked medical bill records.

For each client record there may be only one linked property damage records.

For each client record there may be only one linked loss of earnings records.

For each client record there may be one or more linked cost records.

For each client record there may be one or more linked insurer records.

For each client record there may be one or more linked evidence records.

For each client record there may be one or more linked deposition records.

For each client record there may be one or more linked discovery records.

For each client record there may be one or more linked motion records.

For each client record there will be one linked firm attorney record.

For each insurer record there will be one linked adjuster contact record.

For each defendant record there may be one or more linked insurer records.

For each defendant record there may be one or more linked evidence records.

For each defendant record there may be one or more linked deposition records.

For each defendant record there may be one or more linked discovery records.

For each defendant record there may be one or more linked motion records.

For each attorney record there must be one linked attorney contact record.

For each medical bill record there must be one linked medical provider record.

For each expert witness record there must be one linked expert contact records.

For each arbitration record there must be one linked arbitrator contact record.

The database management program includes instructions for merging data stored in records in the tables with document templates in accordance with predefined merge rules. Thus, after the database management program guides the user through selection of a particular type of document to have generated and database record selection criteria, the database management program generate the selected document on the printer 125 (FIG. 1).

For example, if the user desired to print a blank pleading, the user navigates the database management program until he reaches a list of documents which the database management program can generate. Document choices may be organized into one or more hierarchical or linked menus. Preferably, the database management program responds by requesting the user select a client to which the document will relate. The database management program preferably provides a scrollable list or other device to permit simple and friendly selection of a desired client record. Next, the database management program provides the user with a sub-menu from which the user selects the specific document to be produced—"Blank pleading" in this example.

The database management program then gathers data from the tables to generate the document. In the case of a blank pleading and some other documents, the database management program generates the document in an editable format, such as in a wordprocessor format. The PI Powertool accomplishes this by exporting the data needed by the blank pleading document, and through macros causes WordPerfect to generate the bank pleading.

To generate the blank pleading, the database management program uses the client ID of the client selected by the user to determine the file number of the client's case. From the file number, the database management program can access all of the related defendant records in the defendants table 220, and can obtain the names 602 of all of the defendants in the case. The client ID will also provide access to a client record in the clients table 305, so the database management program can determine which firm attorney 508 is assigned to the case. The identity of the firm attorney from the client record links to the firm attorneys table 405, which will have the name of the attorney 3001 so that the attorney's name is printed at the top of the pleading. The database management program obtains the name of the court through the court ID in the related incident record in the incidents table 205, from which the court's name can be found in the courts table 435. Of course the particular data needed by each document will vary, and one of ordinary skill in the art can identify the tables and fields having the desired data to produce the document and the linked fields necessary to find that data.

The database management program preferably can also print generated documents directly. For example, Judicial Council Forms are in a format which is generally incompatible with most word processors. Accordingly, the Judicial Council Forms are stored in a graphic-type format, and the database management program places the data in the proper position in the desired form. If the user has properly entered all needed data into the database, then the database management program can gather this data, through linkages such as the client ID, fill in the data in the form, and print the form.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. An electronic case manager for a personal injury plaintiffs law office in which client and defendant level data related to an injury incident are collected, the electronic case manager including a computer having a storage device, an output device, and system software for inputting, managing and outputting case data comprising:

(a) a data structure programmed and arranged for classifying data in a relational structure comprising a plurality of tables, the tables comprising plural records relating to personal injury-causing incidents, each record comprising at least one field, the tables comprising:
  (i) a clients table for storing information about clients in client records,
  (ii) a defendants table for storing information about prospective and actual defendants for claims by law office clients for personal injuries in defendant records,
  (iii) an insurers table for storing information about insurers in insurer records,
  (iv) an attorneys table for storing information storing about defense and insurance attorneys in attorney records,
  (v) an incidents table for storing information about injury-causing incidents in incidents records,
  (vi) a property damage table for storing information about property damage in property damage records,
  (vii) a loss of earning table for storing information about loss of earnings in loss of earnings records,
  (viii) a medical bills table for storing information about medical bills in medical bills records,
  (ix) a witnesses table for storing information about witnesses in witness records,
  (x) an expert witnesses table for storing information about expert witnesses in expert witness records,
  (xi) an evidence table for storing information about evidence in evidence records,
  (xii) a litigation table for storing information about litigation in litigation records,
  (xiii) a depositions table for storing information about depositions in deposition records,
  (xiv) a discovery table for storing information about discovery in discovery records,
  (xv) a motions table for storing information about motions in motion records,
  (xvi) a costs table for storing information about court costs in costs records,
  (xvii) an arbitrations table for storing information about arbitrations in arbitration records,
  (xviii) a police reports table for storing information about police reports in police report records
  wherein the tables are linked through certain identical fields, the linkages comprising:
    a file number field is included in and required in the records of the clients table, the defendants table, the insurers table, the attorneys table, the incidents table, the property damage table, the loss of earning table, the medical bills table, the witnesses table, the expert witnesses table, the evidence table, the litigation table, the depositions table, the discovery table, the motions table, the costs table, the arbitrations table and the police reports table, the file number field comprising a unique reference number for referencing incidents,
    a client name field is included in and required in the records of the clients table, the loss of earning table, the medical bills table, the discovery table and the costs table, the client name field comprising a client's name and is unique in each table for each file number, (b) a database manager programmed and arranged for managing the data structure to allow users to generate documents on the output device,
  (i) the database manager including instructions for merging data stored in records in the tables with document templates in accordance with predefined merge rules,
  (ii) the database manager managing the data structure in accordance with predefined structure rules, the structure rules including:
    1) for each incident there will be at least one client record,
    2) for each incident there will be at least one defendant record,
    3) for each incident there will be at least one insurer record,
    4) for each incident there may be one or more attorney records,
    5) for each incident there will be only one incident record,
    6) for each incident there may be one or more property damage records,
    7) for each incident there may be one or more loss of earnings records,
    8) for each incident there may be one or more medical bills records,
    9) for each incident there may be one or more witness records,
    10) for each incident there may be one or more expert witness records,
    11) for each incident there may be one or more evidence records, 12) for each incident there may be one litigation record,
13) for each incident there may be one or more deposition records,
14) for each incident there may be one or more discovery records,
15) for each incident there may be one or more motion records,
16) for each incident there may be one or more costs records.

2. The electronic case manager for a personal injury plaintiffs law office set forth in claim 1, the client records comprising:

(a) a file number field for storing the file number associated with the given incident,
(b) a name field for storing a name of a given client having an injury arising from the given incident,
(c) an address field for storing the given client's mailing address,
(d) a date of birth field for storing the given client's date of birth,
(e) a first government identification field for storing the given client's drivers licence number,
(f) a second government identification field for storing the given client's social security number,
(g) a salutation field for a salutation to the given client,
(h) an event type field for storing a type of event which led to the given client's injury,
(i) an assigned attorney field for storing a name of a law office attorney assigned to represent the given client,
wherein the table includes pre-defined, standard types with filled-in values such that when product components and product component specifications are added, a user may choose from a list of common components to copy thereby promoting efficiency and data integrity.

3. The electronic case manager for a personal injury plaintiffs law office set forth in claim 1, the defendant records comprising:

(a) a file number field for storing the file number associated with the given incident,
(b) a name field for storing a name of a given prospective or actual defendant in the given incident,
(c) an address field for storing the given defendant's mailing address,
(d) a date of birth field for storing the given defendant's date of birth,
(e) a first government identification field for storing the given defendant's drivers licence number,
(f) a defendant entity type field for storing whether the given defendant is male, female or corporate,
(g) a service date field for storing a date when the given defendant was served with a complaint.

4. The electronic case manager for a personal injury plaintiffs law office set forth in claim 1, the insurer records comprising:

(a) a file number field for storing the file number associated with the given incident,
(b) an insured name field for storing a name of a party having insurance coverage relating to the given incident,
(c) an adjuster name field for storing a name of an insurance adjuster assigned to represent an insurer in the given incident with respect to the insured whose name is in the insured name field,
(d) an insurance policy number field for storing an insurance policy number for the insurance policy of the insured whose name is in the insured name field,
(e) a claim number field for storing a claim number used by the insurer with respect to the incident,
(f) a policy limits field for storing the monetary limits of the insurance policy of the insured whose name is in the insured name field,
(g) a medical payments field,
(h) a reimbursement field,
(i) a rental car field for storing whether the insurance policy provides for payment for a rental car,
(j) an uninsured motorist field for storing whether the insurance policy provides for payment for uninsured motorist claims,
(k) an uninsured motorist limits field for storing an amount of coverage for uninsured motorist claims.

5. The electronic case manager for a personal injury plaintiffs law office set forth in claim 1, the incident records comprising:

(a) a file number field for storing the file number associated with the given incident,
(b) an incident date field for storing the date of the given incident,
(c) an accident type field for storing the type of incident,
(d) a location field for storing the location of the incident,
(e) a description field for storing a narrative description of the incident,
(f) a code violation field for storing references to governmental rules, regulations and laws under which a citation was issued for the given incident,
(g) a conditions field for storing a description of any environmental conditions relevant to the given incident,
(h) a prior accidents field.

6. The electronic case manager for a personal injury plaintiffs law office set forth in claim 1, the tables further comprising:

(a) a body shops table for storing information about body shops in body shop records,
(b) an attorney information table for storing information about attorneys in attorney name records,
(c) an adjusters table for storing information about insurance adjusters,
(d) a medical providers table for storing information about medical care providers;
wherein the tables are linked through identical fields, the linkages comprising:
a body shop name field is included in and required in the records of the body shops table and the property damage table, the body shop name field comprising a unique key for referencing a body shop,
an attorney name field is included in and required in the records of the attorneys table and the attorney names table, the attorney name field comprising a unique key for referencing an attorney,
an adjuster field is included in and required in the records of the adjusters table and the insurance table, the adjuster field comprising a unique key for referencing an insurance adjuster,
a medical provider name field is included in and required in the records of the medical providers table and the medical bills table, the medical provider name field comprising a unique key for referencing a medical care provider;

the structure rules including:
  there may be one or more body shops records for each property damage record, and multiple property damage records may have identical data in their body shop name fields,
  there will be one attorney name record for each attorney record, and multiple attorney records may have identical data in their attorney name fields,
  there will be one adjuster record for each insurance record, and multiple insurance records may have identical data in their adjuster name fields,
  there will be one medical provider record for each medical bill record, and multiple medical bill records may have identical data in their medical provider name fields.

* * * * *